(12) United States Patent
Trout

(10) Patent No.: US 10,705,762 B2
(45) Date of Patent: Jul. 7, 2020

(54) FORWARD CACHING APPLICATION PROGRAMMING INTERFACE SYSTEMS AND METHODS

(71) Applicant: Micron Technology, Inc., Boise, ID (US)

(72) Inventor: Harold Robert George Trout, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/428,168

(22) Filed: May 31, 2019

(65) Prior Publication Data

US 2020/0073594 A1    Mar. 5, 2020

Related U.S. Application Data

(60) Provisional application No. 62/725,002, filed on Aug. 30, 2018.

(51) Int. Cl.
| | |
|---|---|
| *G06F 3/06* | (2006.01) |
| *G06F 7/08* | (2006.01) |
| *G06F 13/16* | (2006.01) |
| *G06F 12/06* | (2006.01) |

(52) U.S. Cl.
CPC .............. *G06F 3/0659* (2013.01); *G06F 3/06* (2013.01); *G06F 3/0604* (2013.01); *G06F 3/0631* (2013.01); *G06F 3/0673* (2013.01); *G06F 7/08* (2013.01); *G06F 12/0646* (2013.01);

(Continued)

(58) Field of Classification Search
CPC .............. G06F 13/16; G06F 3/06; G06F 7/08
See application file for complete search history.

(56) References Cited

U.S. PATENT DOCUMENTS

| | | |
|---|---|---|
| 6,173,369 B1 | 1/2001 | Nguyen et al. |
| 6,311,260 B1 | 10/2001 | Stone et al. |
| 7,421,545 B1 | 9/2008 | Wiedenman et al. |

(Continued)

FOREIGN PATENT DOCUMENTS

| | | |
|---|---|---|
| JP | 2011-175621 A | 9/2011 |
| JP | 2016-503934 A | 2/2016 |

OTHER PUBLICATIONS

International Search Report and Written Opinion issued in PCT/US2019/044362, dated Nov. 15, 2019 (10 pages).

*Primary Examiner* — Tammara R Peyton
(74) *Attorney, Agent, or Firm* — Fletcher Yoder, P.C.

(57) ABSTRACT

Systems, apparatuses, and methods related to memory systems and operation are described. A memory system may be communicative coupled to a processor via data buses. The memory system may include a memory array that stores first data at a first storage location and second data at a second storage location. The memory may include a memory controller, which receives a memory access request that requests return of the first data and the second data, determines a data access pattern resulting from the memory access request, determines an access pointer that identifies the first storage location of the first data and the second storage location of the second data, and instructs the memory system to use the access pointer to identify and output the first data and the second data via the data buses to enable the processor to perform an operation based on the first data and the second data.

20 Claims, 7 Drawing Sheets

(52) U.S. Cl.
 CPC .......... *G06F 13/16* (2013.01); *G06F 13/1668* (2013.01); *G06F 2212/1044* (2013.01)

(56) References Cited

U.S. PATENT DOCUMENTS

| | | | |
|---|---|---|---|
| 9,442,801 B2* | 9/2016 | Benedict | G06F 11/106 |
| 10,387,160 B2* | 8/2019 | Surti | G06F 9/3004 |
| 2006/0095679 A1* | 5/2006 | Edirisooriya | G06F 12/0862 |
| | | | 711/137 |

\* cited by examiner

FORWARD CACHING APPLICATION PROGRAMMING INTERFACE SYSTEMS AND METHODS

CROSS-REFERENCE TO RELATED APPLICATION

This application is a Non-Provisional Patent Application claiming priority to and benefit of U.S. Provisional Patent Application No. 62/725,002, entitled "FORWARD CACHING APPLICATION PROGRAMMING INTERFACE SYSTEMS AND METHODS," filed Aug. 30, 2018, which is incorporated herein by reference in its entirety for all purposes.

BACKGROUND

The present disclosure generally relates to memory devices and, more particularly, to address management techniques implemented in a memory sub-system.

Generally, a computing system includes a processing sub-system and a memory sub-system, which may store data accessible to processing circuitry of the processing sub-system. For example, to perform an operation, the processing circuitry may execute corresponding instructions retrieved from a memory device of the memory sub-system. In some instances, data input to the operation may also be retrieved from the memory device. Additionally or alternatively, data output (e.g., resulting) from the operation may be stored in the memory device, for example, to enable subsequent retrieval. However, at least in some instances, operational efficiency of a computing system may be limited by its architecture, for example, which governs the sequence of operations performed in the computing system.

BRIEF DESCRIPTION OF THE DRAWINGS

Various aspects of the present disclosure may be better understood upon reading the following detailed description and upon reference to the drawings in which.

DETAILED DESCRIPTION

Figure 1:
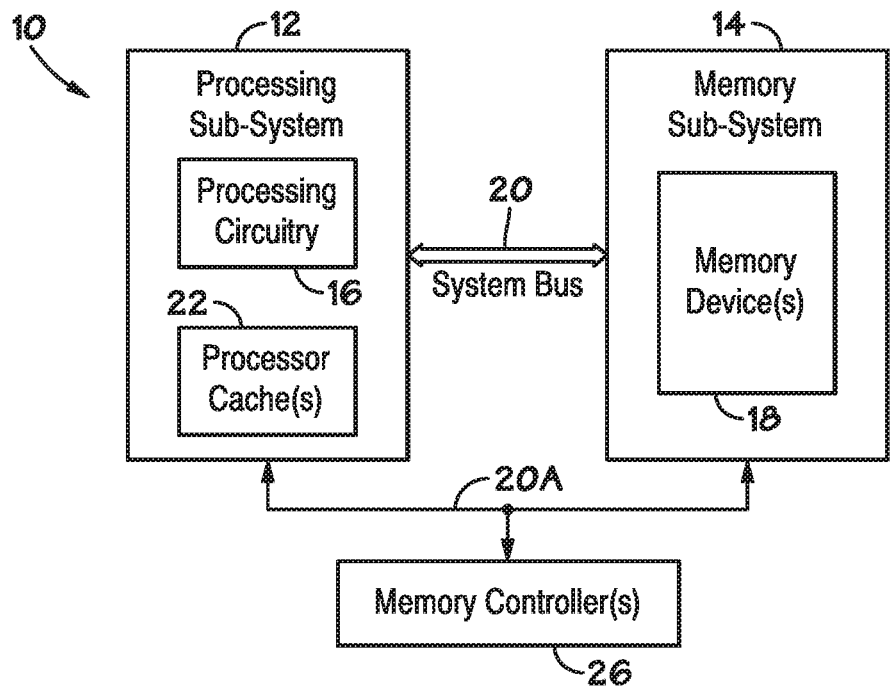
FIG. 1 is a block diagram of a computing system that includes a processing sub-system and a memory sub-system, in accordance with an embodiment of the present disclosure.

The present disclosure provides techniques that facilitate improving operational efficiency of computing systems, for example, by mitigating architectural features that may otherwise limit operational efficiency. Generally, a processing sub-system of a computing system includes processing circuitry, for example, implemented using one or more processors and/or one or more processor cores. Additionally, a memory sub-system of a computing system may include one or more memory devices (e.g., chips or integrated circuits), for example, implemented in one or more memory modules, such as a dual in-line memory module (DIMM).

Generally, memory cells implemented in the memory devices may be organized into one or more main memory arrays, for example, each corresponding with a memory channel. To implement a memory array, memory cells may be coupled to word lines formed in a first (e.g., horizontal) direction and to bit lines formed in a second (e.g., vertical) direction. For example, a row of the memory array may include the memory cells coupled to one word line. Additionally, in some embodiments, a column of the memory array may include the memory cells coupled to multiple bit lines.

In other words, the memory cells (e.g., storage location) connected at a row address and column address pairing may store a data block with bit-depth (e.g., size) dependent on the number of bit lines included in the column identified by the column address. For example, when each column includes 1024 bit-lines, the memory cells implemented at each row address and column address pairing may store a 64 byte (e.g., 1024 bit) data block. Additionally, when the memory array includes sixteen columns, each row of the memory array may store up to sixteen data blocks.

In any case, during operation of the computing system, the processing circuitry may perform various operations by executing corresponding instructions, for example, to determine output data by performing an operation on input data. At least in some instances, data accessible to the processing circuitry may be stored in the memory sub-system. For example, the memory sub-system may store the data input to the operation, the data output (e.g., resulting) from the operation, data indicating the executable instructions, or any combination thereof.

Accordingly, the processing sub-system and the memory sub-system may be communicatively coupled via a system (e.g., data) bus. Generally, the system bus may be implemented to provide a finite communication bandwidth. In fact, at least in some instances, the system bus may be shared with other sub-systems of the computing system, such as a radio frequency (RF) sub-system. In other words, data communication between the processing sub-system and the memory sub-system via the system bus may limit the amount of communication bandwidth available for other computing sub-systems and/or other operations, which, at least in some instances, may limit operational efficiency of the computing system.

In any case, via the system bus, the processing sub-system may output data for storage in the memory sub-system. Additionally or alternatively, via the system bus, the memory sub-system may output (e.g., return) data to the processing sub-system, for example, for processing and/or execution by the processing circuitry implemented in the processing sub-system. In other words, the memory sub-system may store data (e.g., in a main memory array) for subsequent access by the processing sub-system.

To access data stored in the memory sub-system, the processing sub-system may output a memory access request to the memory sub-system via the system bus, which identifies the data, for example, via a virtual memory address. Generally, each memory access request may include overhead (e.g., header data and/or metadata). For example, since the system bus may be shared with other computing sub-systems, a memory access request may include overhead, which indicates that the memory access request is intended for the memory sub-system.

Based at least in part on the memory access request, the memory sub-system may determine the storage location of the data in the memory sub-system, for example, by mapping the virtual memory address to a physical memory address (e.g., row address and column address pairing). Based at least in part on its storage location, the memory sub-system may retrieve the data, for example, from a main (e.g., volatile) memory array and/or a non-volatile memory device implemented in the memory sub-system. In this manner, the memory sub-system may output (e.g., return) target data to the processing sub-system via the system bus, for example, for processing and/or execution by the processing circuitry implemented in the processing sub-system.

At least in some instances, the processing circuitry may perform operations based at least in part on data from multiple data blocks, for example, to execute an application or algorithm. Thus, in some instances, the processing sub-system may successively output memory access requests that each identifies one of the multiple data blocks. For example, the processing sub-system may output a first memory access request that identifies a first data block followed by a second memory access requested that identifies a second data block to the memory sub-system via the system bus.

However, as described above, data communication via the system bus generally utilizes (e.g., consumes) at least a portion of the finite communication bandwidth provided by the system bus. Moreover, data communication via the system bus generally consumes electrical power. In fact, resulting power consumption and/or bandwidth usage is generally dependent on size (e.g., amount) of data being communicated. For example, power consumption used to communicate data via the system bus may increase as size of the data increases. Additionally or alternatively, amount of the finite communication bandwidth provided by the system bus that is used to communicate data may increase as size of the data increases. In other words, since communicated via the system bus, memory access requests may place a lower limit on operational (e.g., communication and/or power) efficiency of a computing system—particularly when successively communicated, for example, due to each memory access request including overhead (e.g., header data and/or metadata).

Accordingly, to facilitate improving operational (e.g., communication and/or power) efficiency, the present disclosure provides techniques for implementing and/or operating a computing system to provide address management functions (e.g., operations or processes) via its memory sub-system. To facilitate providing address management functions, the memory sub-system may include a memory controller. Additionally, to facilitate providing address management functions, the memory sub-system may store a data block as a data record, which utilizes a data structure that allocates specific bit positions for indicating one or more specific data fields.

Merely as an illustrative example, a first data record data structure may allocate bits [0, X] for indicating a name (e.g., first) field, bits [X+1, Y] for indicating a street address (e.g., second) field, and bits [Y+1, Z] for indicating a zip code (e.g., third) field. In other words, a first data record that utilizes the first data structure may indicate the name of a first entity in its name field, the street address of the first entity in its street address field, and the zip code of the first entity in its zip code field. Additionally, a second data record that utilizes the first data structure may indicate the name of a second entity in its name field, the street address of the second entity in its street address field, and the zip code of the second entity in its zip code field.

In some embodiments, different data records may utilize different data structures, for example, which include one or more different data fields. As an illustrative example, a second data record data structure may allocate bits [0, Z−(Y+1)+1] for indicating a zip code field. Thus, a third data record that utilizes the second data structure may indicate the zip code of a third entity in its zip code field.

By storing data using a data record data structure, the memory sub-system (e.g., memory controller) may group data records that each include a specific data field via a corresponding index table, for example, stored in a separate storage (e.g., memory) device and/or in an index table memory array distinct (e.g., separate) from the one or more main memory arrays. To facilitate grouping data records, the memory sub-system may generate an index entry corresponding with each of the data record that includes the specific data field. For example, the memory sub-system may generate a first zip code index entry corresponding with the first data record and a second zip code index entry corresponding with the second data record. Additionally or alternatively, the memory sub-system may generate a third zip code index entry corresponding with the third data record In some embodiments, an index entry corresponding with a data record may indicate the storage location of the data record in the memory sub-system, for example, via a pointer to the storage location of the data record in a main memory array or a non-volatile memory device. In other words, continuing with the above example, the memory sub-system may generate the first zip code index entry to indicate the storage location of the first data record and the second zip code index entry to indicate the storage location of the second data record in the memory sub-system. Additionally or alternatively, the memory sub-system may generate the third zip code index entry corresponding with the third data record to indicate the storage location of the third data record in the memory sub-system.

To group data records that each include a specific data field, the memory sub-system (e.g., memory controller) may store corresponding index entries in index entry positions of a corresponding index table. For example, in the zip code index table, the memory sub-system may store the first zip code index entry at a first index entry position and the second zip code index entry at a second index entry position. Additionally or alternatively, the memory sub-system may store the third zip code index entry at a third index entry position in the zip code index table.

As described above, in some embodiments, an index table may be stored in an index table memory array, for example, distinct (e.g., separate) from the one or more main memory arrays implemented in the memory sub-system. In fact, in some embodiments, the index table memory array may be implemented with a different memory type compared to a main memory array. For example, the index table memory array may be implemented with a relatively faster memory type, such as static random-access memory (SRAM), while the main memory array is implemented with a relatively slower memory type, such as dynamic random-access memory (DRAM).

Moreover, in some embodiments, the index table memory array may be implemented such that index tables are each stored in a corresponding memory cell row. For example, the zip code index table may be stored in a first memory cell row of the index table memory array while a street address index table is stored in a second memory cell row of the index table memory array. Additionally, in some embodiments, the index table memory array may be implemented such that index table entries are each stored in a corresponding memory cell column. In other words, the memory cells at each row address and column address pairing in the index table memory array may be implemented as an index table entry position. For example, a first index entry position of the zip code index table may be implemented at a first column of the first memory cell row and a second index entry position of the zip code index table may be implemented at a second column of the first memory cell row.

In any case, by traversing the index entries included in an index table, the memory sub-system (e.g., memory controller) may identify data records that each include a corresponding data field. For example, the memory sub-system may read the first index entry position in the zip code index table to determine the first zip code index entry, the second index entry position in the zip code index table to determine the second zip code index entry, and so on. Additionally, the memory sub-system may read the first pointer included in the first zip code index entry, which is indicative of the storage location of the first data record, to identify the first data record and, thus, that the first data record includes the zip code field. Similarly, the memory sub-system may read the second pointer included in the second zip code index entry, which is indicative of the storage location of the second data record, to identify the second data record and, thus, that the second data record includes the zip code field. Additionally or alternatively, the memory sub-system may read the third pointer included in the third zip code index entry, which is indicative of the storage location of the third data record, to identify the third data record and, thus, that the third data record includes the zip code field To facilitate accessing (e.g., reading and/or writing) index table entries, in some embodiments, the memory sub-system may include an entry unit coupled to each memory cell column of the index table memory array, for example, via corresponding column amplifiers. In other words, a first entry unit may be coupled to a first memory cell column of the index table memory array, a second entry unit may be coupled to a second memory cell column of the index table memory array, and so on. Additionally, in some embodiments, each entry unit may be implemented with a (e.g., 64 byte) register, thereby enabling an entry unit to read (e.g., retrieve) an index entry from the index table memory array and/or write (e.g., store) the index entry into the index table memory array.

In some embodiments, in addition to the storage location of a corresponding data record, an index entry may indicate the value of one or more data fields included in the data record. For example, the first zip code index entry may include a first zip code value indicated by the zip code field of the first data record and the second zip code index entry may include a second zip code value indicated by the zip code field of the second data record. Additionally or alternatively, the third zip code index entry may include a third zip code value indicated by the zip code field of the third data record.

In some embodiments, including data field values in index entries may enable the memory sub-system (e.g., memory controller) to adaptively (e.g., dynamically) adjust interrelationships between data records merely by adjusting order (e.g., index entry position) of the index entries in an index table, for example, without adjusting the corresponding data records. In particular, the memory sub-system may sort the index entries such that the data field values indicated by the index entries are in ascending order, descending order, or any other suitable order. For example, when sorting in descending order, the memory sub-system may indicate the index entry including the largest data field value in the first index entry position of a corresponding index table and so on with the index entry including the smallest data field value in the last index entry position.

On the other hand, when sorting in ascending order, the memory sub-system may indicate the index entry including the smallest data field value in the first index entry position of a corresponding index table and so on with the index entry including the largest data field value in the last index entry position. For example, when sorting in ascending order, the first zip code index entry may be indicated at the first index entry position and the second zip code index entry may be indicated at the second (e.g., last) index entry position when the value of the first zip code field is "83704" and the value of the second zip code field is "83707." Additionally or alternatively, when sorting in ascending order, the third zip code index entry may be indicated at the third index entry position when the value of the third zip code field is "83713."

To facilitate generating index entries, in some embodiments, the memory sub-system may provide an application programming interface (API) that includes an allocation function. In some embodiments, input parameters (e.g., operators) to the allocation function may include a pointer to storage location of a block of one or more data records in the memory sub-system, the number of data records included in the block, the size of each of the data records, the number of data fields to be indexed, and/or the specific data fields to be indexed. In other words, input parameters to the allocation function (e.g., size of a data record, the number of data fields to be indexed, and/or the specific data fields to be indexed) may be determined based at least in part on parameters of a data structure implemented by the data record.

In some embodiments, the data structure of a data record may be predefined, for example, such that an indication of the data structure is previously stored in the memory sub-system. Additionally or alternatively, the data structure of a data record may be explicitly indicated, for example, via metadata (e.g., header data) included with the data record and/or a separate control signal (e.g., command or request) received along with the data record. In any case, by executing the allocation function, the memory sub-system may allocate storage locations indicated by the input parameters (e.g., starting storage location of block+(number of data records in block*size of each data record)) for storage of one or more data records that utilize the data structure.

Moreover, to facilitate including an index entry in an index table, the memory sub-system may process (e.g., analyze, evaluate, and/or adjust) the index entry, for example, by comparing the index entry with another index entry already included in the index table. Thus, in some embodiments, the memory sub-system be implemented with processing circuitry, for example, implemented in the memory controller and/or other processing circuitry distinct (e.g., separate) from the processing sub-system. However, to enable performing more complex data processing operations, processing circuitry is generally more highly doped compared to memory circuitry. Additionally, higher doping generally increases likelihood of producing leakage current, which, at least in some instances, may affect operational reliability of the memory sub-system, for example, by resulting in corruption of data stored in the memory sub-system.

Thus, in some embodiments, the memory sub-system may be implemented with limited processing capabilities, for example, compared to the processing sub-system and/or a processor-in-memory (PIM). In some embodiments, the processing performed by the memory sub-system may be implemented with comparison logic circuitry. For example, an entry unit coupled to the index table memory array may include comparison logic circuitry implemented to compare a data field value stored in its register with an input data field value (e.g., included in a different index entry). In some embodiments, the comparison logic circuitry may indicate whether the data field value stored in the register of the entry unit is greater than the input data field value. Additionally or alternatively, the comparison logic circuitry may indicate whether the data field value stored in the register of the entry unit is less than the input data field value.

To facilitate sorting, adjacent entry units may be communicatively coupled, for example, to enable a first entry unit to shift an index entry stored in its register to a second entry unit. As described above, index entries included in an index table may be sorted such that the data field values indicated by the index entries are in ascending order, descending order, or any other suitable order. For example, when sorting in ascending order and a new (e.g., input) zip code index entry indicates a new zip code field value of "83706," the first entry unit may compare the zip code field values indicated by the new zip code index entry and a first zip code index entry stored at a first index entry position of the zip code index table. When the first zip code index entry indicates a first zip code field value of "83704," the first entry unit may determine that the new zip code field value indicated by the new zip code index entry is greater than the first zip code field value indicated by the first zip code index entry.

Additionally, the second entry unit may compare the zip code field values indicated by the new zip code index entry and a second zip code index entry stored at a second index entry position of the zip code index table, for example, after the first entry unit determines that the new zip code field value is greater than the first zip code field value. When the new zip code index entry indicates the new zip code field value as "83706" and the second zip code index entry indicates a second zip code field value of "83707," the second entry unit may determine that the new zip code field value is not greater than the second zip code field value. As such, the second entry unit may shift the second zip code index entry to a third entry unit coupled to a third index entry position in the zip code index table, thereby shifting the second zip code index entry from the second index entry position to the third index entry position.

In a similar manner, downstream entry units may compare and/or shift index entries. For example, the third index entry unit may compare the zip code field values indicated by the second (e.g., input) zip code index entry and a third zip code index entry stored at a third index entry position of the zip code index table. When the second zip code index entry indicates that the value of the second zip code field is "83707" and the third zip code index entry indicates a third zip code field value of "83713," the third entry unit may determine that the second zip code field value is not greater than the third zip code field value. As such, the third entry unit may shift the third zip code index entry to a fourth entry unit coupled to a fourth index entry position in the zip code index table, thereby shifting the third zip code index entry from the third index entry position to the fourth index entry position.

However, in some embodiments, storing an index entry in an entry unit may overwrite an index entry previously stored in the entry unit, for example, due to the size of its buffer relative to the size of an index entry. Accordingly, in some embodiments, an entry unit may store an index entry into its register after an index entry previously stored in its register is output, for example, to another entry unit and/or the index table memory array. In other words, continuing with the above example, the second entry unit may store the new zip code index entry into its register after the second zip code index entry is shifted to the third entry unit, the third entry unit may store the second zip code index entry into its register after the third zip code index entry is shifted to the fourth entry unit, and so on.

To reduce the likelihood of the address management functions affecting data retrieval latency, in some embodiments, the memory sub-system (e.g., memory controller) may index a data record while the processing sub-system is not expected to target the data record. For example, the memory sub-system may index a data record in response to the data record being written to a main memory array (e.g., memory channel) of the memory sub-system. In other words, the memory sub-system may opportunistically perform indexing operations to reduce likelihood of the indexing operations delaying return of targeted data to the processing sub-system, which, at least in some instances, may facilitate improving operational efficiency of the computing system.

Moreover, implementing address management functions in this manner may facilitate reducing the amount of data communicated between the processing sub-system and the memory sub-system, for example, to request data from multiple data records and/or to return targeted data. In particular, in some embodiments, implementing address management functions in this manner may enable the memory sub-system to return only targeted portions (e.g., one or more data fields) of one or more data records, which, at least in some instances, may facilitate reducing data communication from the memory sub-system to the processing system via the system bus. Additionally or alternatively, implementing address management functions in this manner may enable the processing sub-system to request data from multiple data records using fewer memory access requests, which, at least in some instances, may facilitate reducing data communication from the processing sub-system to the memory sub-system via the system bus.

For example, instead of separately (e.g., successively) requesting data from multiple data records, the processing sub-system may output a single memory access request that identifies the target data. In some embodiments, to access multiple data records in accordance with a sorted order, the processing sub-system may output a memory access request that identifies a target access index and one or more target index entry positions included in the target index table. For example, the processing sub-system may output a memory access request that identifies the zip code field as a target access index and a vector [N, M] of target index entry positions.

Based on the target access index, the memory sub-system (e.g., memory controller) may identify a corresponding index table. For example, when the target access index is the zip code field, the memory controller may identify the zip code index table. Additionally or alternatively, when the target access index is the name field, the memory controller may identify a name index table.

To facilitate identifying a target index table, in some embodiments, the memory sub-system may provide an application programming interface (API) that includes a sorted access function. In some embodiments, input parameters (e.g., operators) to the sorted access function may include a pointer to the storage location of a block of one or more data records in the memory sub-system and a specific data field to be indexed. Additionally, by executing the sorted access function, the memory sub-system may determine a sorted access pointer, for example, which indicates storage location of a corresponding index table in the index table memory array. In other words, to facilitate identifying the target index table, the memory sub-system may determine a sorted access pointer corresponding with the target access index indicated by the memory access request.

Additionally, based at least in part on the memory access request, the memory sub-system (e.g., memory controller) may identify which index entry positions in the target index table to read. For example, when the memory access request includes the vector [M, N], the memory sub-system may determine that index entries are to be read from an M+1th index entry position to an N+1th index entry position in the target index table. As an illustrative example, when the memory access request includes the vector [0, 1], the memory sub-system may determine that index are to be read from the first index entry position and the second index entry position of the identified index table.

Furthermore, based at least in part on the index entries stored at the identified index entry positions, the memory sub-system (e.g., memory controller) may identify (e.g., retrieve) corresponding data records. For example, based at least in part on the first zip code index entry, the memory sub-system may identify the first data record. Similarly, based at least in part on the second zip code index entry, the memory sub-system may identify the second data record. In this manner, the processing sub-system may request access to multiple data records in accordance with a sorted order using fewer memory access requests, which, at least in some instances, may facilitate reducing data communication from the processing sub-system to the memory sub-system via the system bus.

Moreover, in some embodiments, the processing sub-system may target specific portions or subsets (e.g., one or more data fields) from multiple data records, for example, stored as a contiguous block in a main memory array. To access specific portions of multiple data records, in some embodiments, the processing sub-system may output a memory access request that identifies the storage location of the block of data records and a targeted portion of each of the data records. For example, the processing sub-system may output a memory access request that identifies a block of memory addresses in the main memory array and that the zip code field is targeted.

To facilitate accessing targeted portions of multiple data records, in some embodiments, the memory sub-system may provide an application programming interface (API) that includes a striding access function. In some embodiments, input parameters (e.g., operators) to the striding access function may include a pointer to the storage location of a block of one or more data records in the memory sub-system, the starting bit position of a target data field in a data record, the size of the target data field, and the stride length between successive data records. Thus, in some embodiments, input parameters to the striding access function (e.g., the starting bit position of a target data field in a data record, the size of the target data field, and/or the stride length between successive data records) may be determined based at least in part on the data structure of the data records.

Additionally, by executing the striding access function, the memory sub-system may determine a striding access pointer, for example, which indicates storage location of the targeted portions of multiple data records. In other words, using the striding access pointer, the memory sub-system may identify (e.g., retrieve) targeted portions of multiple data records. In this manner, the processing sub-system may request access to specific portions of multiple data records (e.g., in accordance with an address order) using fewer memory access requests, which, at least in some instances, may facilitate reducing data communication from the processing sub-system to the memory sub-system via the system bus.

As described above, after identifying targeted data, the memory sub-system may output (e.g., return) the targeted data to the processing sub-system via the system bus, for example, for processing and/or execution by the processing circuitry implemented in the processing sub-system. In fact, in some embodiments, providing striding access to stored data may also facilitate reducing data communication from the memory sub-system to the processing sub-system via the system bus. For example, by providing striding access, the memory sub-system may output only the targeted portions of the data records instead of the complete data records, which includes data other than the targeted portions.

In any case, data communication between different computing sub-systems is generally slower than data communication within a computing sub-system, for example, due to timing of the different computing sub-systems, the system bus being shared with other computing sub-systems, and/or communication distance between the different sub-systems. In other words, data communication within (e.g., internal to) the processing sub-system may be faster than data communication between the processing sub-system and the memory sub-system. Thus, to facilitate improving operational efficiency, one or more caches may be implemented in the processing sub-system. For example, the processing sub-system may be implemented with one or more processor-side caches, such as an L1 cache, an L2 cache, and/or an L3 cache integrated with the processing circuitry.

To facilitate leveraging the faster data communication provided by a cache, in some embodiments, the memory sub-system may store targeted data directly into a processor-side cache. In fact, in some embodiments, the memory sub-system may automatically store targeted data directly into a higher level (e.g., shared) processor-side cache, such an L3 cache. In other words, in such embodiments, the memory sub-system may store data targeted by a memory access request directly into a processor-side cache in response to the memory access request, for example, without further instruction from the processing sub-system.

In fact, in some embodiments, the memory sub-system may non-deterministically return targeted data, for example, in an out of order manner. Thus, when implemented to automatically store targeted data directly into a processor-side cache, the memory sub-system may output a control signal to the processing sub-system, which indicates when storage of targeted data into the processor-side cache is complete. In some embodiments, the memory sub-system may output the control signal each time target data from a data record is successfully stored in the processor-side cache. Additionally or alternatively, the memory sub-system may output the control signal after all target data identified by a memory access request is successfully stored in the processor-side cache.

To facilitate further leveraging the faster data communication provided by a cache, in some embodiments, the memory sub-system (e.g., memory controller) may predictively identify data (e.g., a data record or data field) expected to be subsequently targeted by the processing sub-system. In other words, the memory sub-system may predict a data access pattern expected to subsequently occur and preemptively identify data accordingly, which, in some embodiments, may enable the memory sub-system to directly store target data into a processor-side cache before the processing sub-system even targets the data. As such, when the processing circuitry actually targets the data (e.g., for processing and/or execution), the processing sub-system may determine that the target data is already stored in a processor-side cache and, thus, provide the target data to the processing circuitry via the processor-side cache, for example, instead of requesting the target data from the memory sub-system and waiting for return of the target data.

In some embodiments, the memory sub-system (e.g., memory controller) may predict what data will be subsequently targeted based at least in part on what data is currently being targeted by the processing sub-system and/or in what order. As described above, the processing sub-system may target data from multiple data records, for example, via a single memory access request. Thus, in some embodiments, the memory sub-system may determine a data access pattern that results in the data from the multiple data records being targeted and extrapolating the data access pattern to predict what data will be subsequently targeted by the processing sub-system.

For example, when a memory access request targets a vector [0, 1] of index entry positions, the memory sub-system may predict that the processing sub-system will subsequently target index entries at a third index entry position and a fourth index entry position. In other words, in this manner, the memory sub-system may identify target index entries and corresponding data records before the processing sub-system actually requests the data. In fact, in some embodiments, the memory sub-system may preemptively store data records expected to be subsequently targeted by the processing sub-system directly into a processor-side cache, which, at least in some instances, may facilitate reducing data retrieval latency.

Moreover, in some embodiments, the memory sub-system (e.g., memory controller) may predict what data will subsequently be targeted based at least in part on the data structure of data records stored in the memory sub-system. As described in the illustrative example above, a first data record data structure may allocate bits [0, X] for indicating a name field, bits [X+1, Y] for indicating a street address field, and bits [Y+1, Z] for indicating a zip code (e.g., third) field. Thus, when a memory access request targets the street address field, the memory sub-system may predict that the processing sub-system will subsequently the zip code field, for example, since the first data record data structure allocates the bit positions directly after the street address field for indicating the zip code. In this manner, the memory sub-system may identify target portions of data records before actually being requested by the processing sub-system. In fact, in some embodiments, the memory sub-system may preemptively store portions of data records expected to be subsequently targeted by the processing sub-system directly into a processor-side cache.

In other words, as will be described in more detail below, the present disclosure describes techniques for implementing and/or operating a memory sub-system such that data records may be stored in a main memory array while index entries (e.g., metadata) associated with the data records is stored in a specialized portion of the memory sub-system, for example, an index table memory array that uses advanced lookup techniques to manage the metadata. In some embodiments, this many enable the memory sub-system to perform significant (e.g., advanced) memory addressing operations of behalf of the processing sub-system. For example, the memory sub-system may implement forward caching techniques by which the memory sub-system anticipates (e.g., predicts) an upcoming memory access request from the processing sub-system and prepares data expected to be requested in advance of the memory access request. Thus, at least in some instances, implementing and operating a memory sub-system in this manner may facilitate improving operational (e.g., power and/or communication) efficiency, for example, by relieving a processing sub-system of address computation and/or lowering the effective data retrieval latency experienced by the processing sub-system.

Additionally or alternatively, a memory sub-system may implement fast (e.g., improved) forward caching techniques by which the memory sub-system asynchronously transfers requested data to a processing sub-system. Building on the forward caching techniques, in some embodiments, the memory sub-system may preemptively transfer data expected to be targeted by an anticipated memory access request to the processing sub-system, thereby delivering data expected to be requested by the processing sub-system in advance of the memory access request. Thus, at least in some instances, implementing and operating a memory sub-system in this manner may further facilitate improving operational (e.g., power and/or communication) efficiency, for example, by further lowering the effective data retrieval latency experienced by the processing sub-system (e.g., to zero in ideal circumstances).

Moreover, as will be described in more detail below, an application programming interface (API) may provide tools (e.g., functions) to facilitate supporting advanced memory addressing techniques, such as forward caching techniques and/or fast forward caching techniques. In some embodiments, the programming techniques may encompass different memory access patterns abstracted under the concept of an access axis. For example, an access axis may provide sufficient information (e.g., metadata) to enable a memory sub-system to access stored data in a straight (e.g., address) order, a striding order, and/or a sorted order. In any case, at least in some instances, implementing and operating a computing system in this manner may facilitate improving operational (e.g., power and/or communication) efficiency, for example, by reducing data retrieval latency, reducing data communication via a system bus, and/or increasing communication bandwidth available to other computing sub-systems.

To help illustrate, an example of a computing system 10 (e.g., apparatus), which includes a processing sub-system 12 and a memory sub-system 14, is shown in FIG. 1. It should be appreciated that the depicted embodiment is merely intended to be illustrative and not limiting. In particular, the computing system 10 may additionally or alternatively include other computing sub-systems. For example, the computing system 10 may additionally include a networking sub-system, a radio frequency sub-system, a user input sub-system, and/or a display sub-system.

Moreover, in some embodiments, the computing system 10 may be implemented in a single electronic device, such as a desktop computer, a workstation computer, a laptop computer, a server, a mobile phone, a virtual-reality headset, and/or the like. In other embodiments, the computing system 10 may be distributed between multiple electronic devices. For example, the processing sub-system 12 and the memory sub-system 14 may be implemented in a host device while other computing sub-systems, such as the user input sub-system and/or the display sub-system, are implemented in a client (e.g., remote) device. In fact, in some embodiments, a computing sub-system may be distributed between multiple electronic devices. For example, a first portion of the processing sub-system 12 and/or a first portion of the memory sub-system 14 may be implemented in a host device while a second portion of the processing sub-system 12 and/or a second portion of the memory sub-system 14 are implemented in a client device.

In any case, the processing sub-system 12 generally performs various operations during operation of the computing system 10, for example, to determine output data by executing instructions to perform a corresponding operation on input data. Thus, as in the depicted example, the processing sub-system 12 may include processing circuitry 16. In some embodiments, the processing circuitry 16 may include one or more central processing units (CPUs), one or more graphics processing units (GPUs), one or more processor cores, or any combination thereof.

Additionally, as described above, the memory sub-system 14 generally stores data accessible to the processing sub-system 12, for example, including the output data, the input data, and/or data that indicates the executable instructions. Thus, as in the depicted example, the memory sub-system 14 may include one or more memory devices 18 (e.g., chips or integrated circuits). As will be described in more detail below, in some embodiments, the memory devices 18 may include memory cells (e.g., circuitry) organized into one or more memory arrays and, thus, may include one or more tangible, non-transitory, computer-readable media. For example, the memory sub-system 14 may include one or more volatile memory devices, such as a dynamic random-access memory (DRAM) device or a static random-access memory (SRAM) device, and/or one or more non-volatile memory devices, such as a flash (e.g., NAND) memory device, a phase-change memory (e.g., 3D XPoint™) memory device, a ferroelectric random access memory (FeRAM) device, or any combination thereof.

Moreover, in some embodiments, multiple memory devices 18 may be implemented on a memory module, such as a dual in-line memory module (DIMM) or a single in-line memory module (SIMM). For example, a memory module may include a printed circuit board (PCB) and multiple memory devices each disposed on a flat or planar (e.g., front or back) surface of the printed circuit board. Additionally, the memory devices 18 may be coupled to external pins formed along an (e.g., bottom) edge of the printed circuit board via conductive traces formed on the printed circuit board.

It should be appreciated that one or more of the memory devices 18 may be implemented using other packing techniques. For example, the memory devices 18 may be coupled to a semiconductor (e.g., silicon) interposer to implement a 2.5D configuration. Additionally or alternatively, the memory devices 18 may be stacked to implement a 3D configuration. Furthermore, in some embodiments, the memory device 18 may be implemented using organic packaging techniques. In other words, the techniques described in the present disclosure may be implemented as an on-package solution.

In any case, as described above, the memory sub-system 14 generally stores data accessible to the processing sub-system 12. To facilitate data communication, the memory sub-system 14 and the processing sub-system 12 may be communicatively via a system bus 20, for example, which includes one or more data buses. In some embodiments, the system bus 20 may include one or more cables, one or more wires, one or more conductive traces, one or more communication networks, or any combination thereof and, thus, may be implemented to provide a finite communication bandwidth. In any case, via the system bus 20, the processing sub-system 12 may communicate (e.g., output) data for storage in the memory sub-system 14. Additionally or alternatively, via the system bus 20, the memory sub-system 14 may communicate (e.g., output) data for processing and/or execution by the processing sub-system 12, for example, in response to a request for data targeted by the processing circuitry 16 of the processing sub-system 12.

However, as described above, data communication between different computing sub-systems is generally slower than data communication within a computing sub-system. In other words, data communication within (e.g., internal to) the processing sub-system 12 may be faster and, thus, facilitate reducing data retrieval latency compared to data communication between the processing sub-system 12 and the memory sub-system 14, for example, due to the system bus 20 being shared with other computing sub-systems, timing difference between the processing sub-system 12 and the memory sub-system 14, and/or communication distance between the processing sub-system 12 and the memory sub-system 14. Thus, to facilitate improving operational efficiency, caches may be implemented between the processing circuitry 16 of the processing sub-system 12 and the memory devices 18 of the memory sub-system 14, for example, to store an instance (e.g., copy) of data also stored in the memory devices 18.

As in the depicted example, the caches may include one or more processor-side caches 22 implemented in the processing sub-system 12. In some embodiments, one or more of the processor-side caches 22 may be integrated with the processing circuitry 16. For example, the processor-side caches 22 may include an L1 cache, an L2 cache, and/or an L3 cache. To facilitate reducing data retrieval latency, in some embodiments, a processor-side cache 22 may be implemented using different memory compared to the memory devices 18 implemented in the memory sub-system 14. For example, the processor-side cache 22 may be implemented with static random-access memory (SRAM) while the memory devices 18 are implemented with dynamic random-access memory (DRAM) and/or non-volatile memory.

To facilitate controlling data storage in the caches and/or the memory devices 18, the computing system 10 may include one or more memory controllers 26, for example, communicatively coupled to the caches and/or the memory devices 18 via an instruction bus 20A. In some embodiments, one or more of the memory controllers 26 may be implemented in the memory sub-system 14, for example, as a memory-side memory controller 26. Additionally or alternatively, one or more of the memory controllers 26 may be implemented in the processing sub-system 12, for example, as a processor-side memory controller 26.

Figure 2:
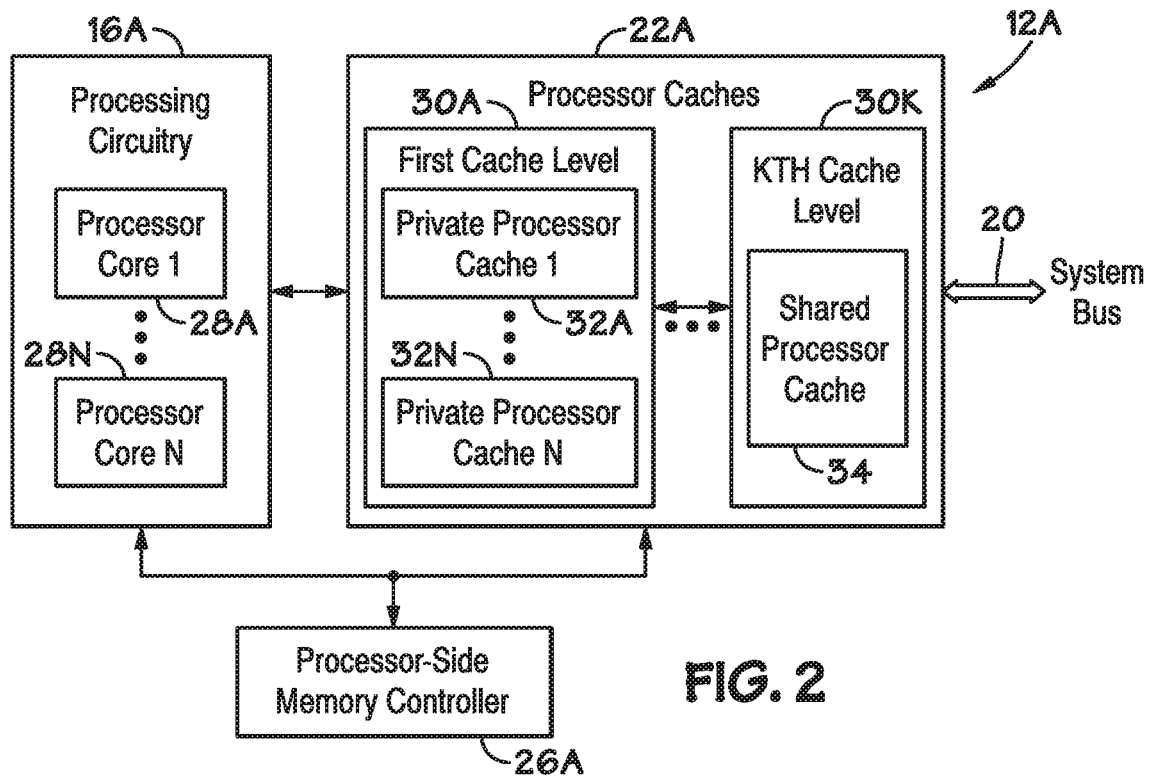
FIG. 2 is a block diagram of an example of the processing sub-system of FIG. 1, in accordance with an embodiment of the present disclosure.

To help illustrate, an example of a processing sub-system 12A, which includes a processor-side memory controller 26A, is shown in FIG. 2. As described above, processing circuitry 16 may be implemented using one or more processor cores 28. For example, as in the depicted embodiment, the processing circuitry 16A of the processing sub-system 12A may include a first processor core 28A and an Nth processor core 28N.

Additionally, as in the depicted embodiment, the caches may be hierarchically organized into different cache levels 30. For example, the processor-side caches 22A may be organized into a first (e.g., lower) cache level 30A and a Kth (e.g., higher) cache level 30K, which may be communicatively coupled to the memory system via the system bus 20. In some embodiments, the processor-side caches 22A may be implemented using volatile memory, such as static random-access memory (SRAM) and/or dynamic random-access memory (DRAM).

Additionally, in some embodiments, the processor-side caches 22A implemented in the first cache level 30A may be dedicated to a corresponding processor core 28. In other words, in such embodiments, the first level cache 30A may be implemented using one or more private processor-side caches 32. For example, a first processor-side cache 32A implemented in the first cache level 30A may be dedicated to the first processor core 28A and an Nth private processor-side cache 32N implemented in the first cache level 30A may be dedicated to the Nth processor core 28N. In other words, in some embodiments, the private processor-side caches 32 implemented in the first cache level 30A may include one or more L1 caches.

In some embodiments, higher cache levels may be also be implemented with one or more private processor-side caches 32. For example, a second cache level 30 may be implemented with another private processor-side cache 32 dedicated to the first processor core 28A and another private processor-side cache 32 dedicated to the Nth processor core 28N. In other words, in some embodiments, the private processor-side caches 32 implemented in the second cache level 30 may include one or more L2 caches.

Additionally or alternatively, a processor-side cache 22 implemented in a higher cache level may be shared between multiple processor cores 28. For example, in the depicted embodiment, the Kth cache level 30K may be implemented with a shared processor-side cache 34, which is shared by the first processor core 28A and the Nth processor core 28N. In other words, in some embodiments, the shared processor-side cache 34 implemented in the Kth cache level 30K may include an L3 cache.

In any case, as described above, a cache generally provides faster data access (e.g., read and/or write) speeds compared to a main memory array implemented in the memory devices 18 of the memory sub-system 14. However, storage capacity of the cache is generally smaller than storage capacity of the main memory array. In fact, in some embodiments, the total storage capacity of the processor-side caches 22A may be smaller than storage capacity of the one or more main memory arrays.

Accordingly, to facilitate improving data access speed and, thus, operational efficiency of the computing system 10, the processor-side memory controller 26A may control data storage in the processor-side caches 22A based at least in part on when data is expected to be targeted (e.g., requested) by the processing circuitry 16A. For example, the processor-side memory controller 26A may control data storage such that instances (e.g., copies) of data expected to be targeted by the processing circuitry 16A are stored in one or more of the processor-side caches 22A before the processing circuitry 16A actually targets the data. On the other hand, to facilitate conserving (e.g., optimizing) storage capacity of the processor-side caches 22A, the processor-side memory controller 26A may control data storage such that instances of data blocks 29 not expected to be targeted by the processing circuitry 16A during an upcoming control horizon (e.g., duration) are not stored in the processor-side caches 22A.

Moreover, in some embodiments, data storage in the processor-side caches 22A may be controlled based at least in part on hierarchical cache level. For example, the processor-side memory controller 26A may be implemented to exclusively control data storage in a lower cache level 30, such as the first cache level 30A. On the other hand, in some embodiments, the processor-side memory controller 26A may share control over data storage in a higher cache level 30, such as the Kth cache level 30K, for example, with a memory-side memory controller 26. As will be described in more detail below, at least in some instances, sharing control over data storage in a cache level 30 may facilitate improving operational efficiency of the computing system 10, for example, by enabling the memory sub-system 14 to directly and/or predictively store data into the processor-side caches 22.

Figure 3:
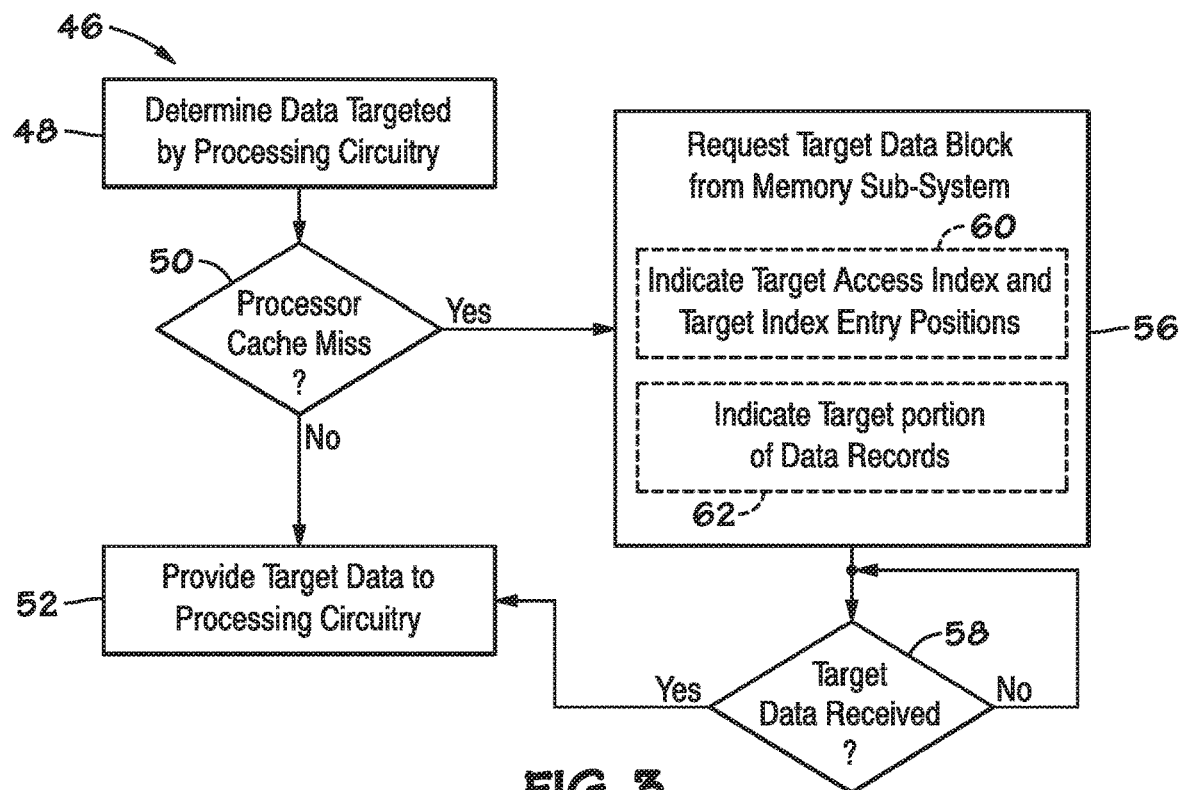
FIG. 3 is a flow diagram of an example process for operating the processing sub-system of FIG. 2, in accordance with an embodiment of the present disclosure

An example of a process 46 for operating a memory controller 26, such as a processor-side memory controller 26A, is described in FIG. 3. Generally, the process 46 includes determining data targeted by processing circuitry (process block 48), determining whether the target data results in a processor-side cache miss (decision block 50), and providing the target data to the processing circuitry (process block 52). Additionally, when the target data results in a processor-side cache miss, the process 46 includes requesting the target data from a memory sub-system (process block 56) and determining whether the target data has been received from the memory sub-system (decision block 58).

Although described in a particular order, which represents a particular embodiment, it should be noted that the process 46 may be performed in any suitable order. Additionally, embodiments of the process 46 may omit process blocks and/or include additional process blocks. Moreover, in some embodiments, the process 46 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., processor-side memory controller 26A) may determine data (e.g., data record or one or more data fields) targeted by processing circuitry 16 of a computing system 10 (process block 48). In some embodiments, processing circuitry 16 may identify a target data using a corresponding (e.g., target) virtual memory address, for example, included in a memory access request. Based at least in part on the target virtual memory address, the memory controller 26 may determine a corresponding (e.g., target) physical memory address, which indicates the storage location of the target data in the computing system 10.

Additionally, the memory controller 26 may determine whether the target data results in a processor-side cache miss (decision block 50). In some embodiments, the memory controller 26 may determine whether data is stored in a cache based at least in part on a virtual memory address and/or a physical memory address associated with the data. For example, based at least in part on its virtual memory address and physical memory address, the memory controller 26 may determine a target value of tag metadata expected to be associated with the target data.

By searching the processor-side caches 22 based on the target tag metadata value, the memory controller 26 may determine whether the target data results in a processor-side cache miss. For example, when the target tag metadata value does not match the tag metadata 33 included in any of the processor-side caches 22, the memory controller 26 may determine that the target data results in a processor-side cache miss. On the other hand, when the tag metadata 33 is included in one or more of the processor-side caches 22, the memory controller 26 may determine that the target data results in a processor-side cache hit and, thus, does not result in a processor-side cache miss.

When the target data does not result in a processor-side cache miss, the memory controller 26 may instruct the processor-side caches 22 to supply the target data to the processing circuitry 16 to facilitate improving data retrieval speed and, thus, operational efficiency of the computing system 10 (process block 52). In some embodiments, a processor-side caches 22 may output a cache line with tag metadata that matches the target tag metadata value expected to be associated with the target data. When stored in a higher (e.g., Kth) cache level 30, in some embodiments, the target data may pass through one or more lower (e.g., first) cache levels before reaching the processing circuitry 16.

On the other hand, when it results in a processor-side cache miss, the memory controller 26 may request the target data from a memory sub-system 14 of the computing system 10 (process block 56). In some embodiments, the memory controller 26 may instruct the memory sub-system 14 to retrieve the target data by outputting a memory access request that identifies the target data. To facilitate improving operational efficiency of the computing system 10, in some embodiments, the memory controller 26 may instruct the memory sub-system 14 to retrieve target data from multiple data records stored in the memory sub-system 14 via a single memory access request.

For example, to access multiple data records in a sorted order, the memory controller 26 may output a memory access request that identifies a target access index and a vector [N, M] of target index entry positions (process block 60). Additionally or alternatively, to access specific portions (e.g., one or more data fields) of a block of data records (e.g., in address order), the memory controller 26 may output a memory access request that identifies the storage location of the block of data records and a targeted portion of each of the data records (process block 62). In any case, based at least in part on the memory access request, the memory sub-system 14 may identify the target data, for example, via a memory-side memory controller 26 implemented in the memory sub-system 14.

Figure 4:
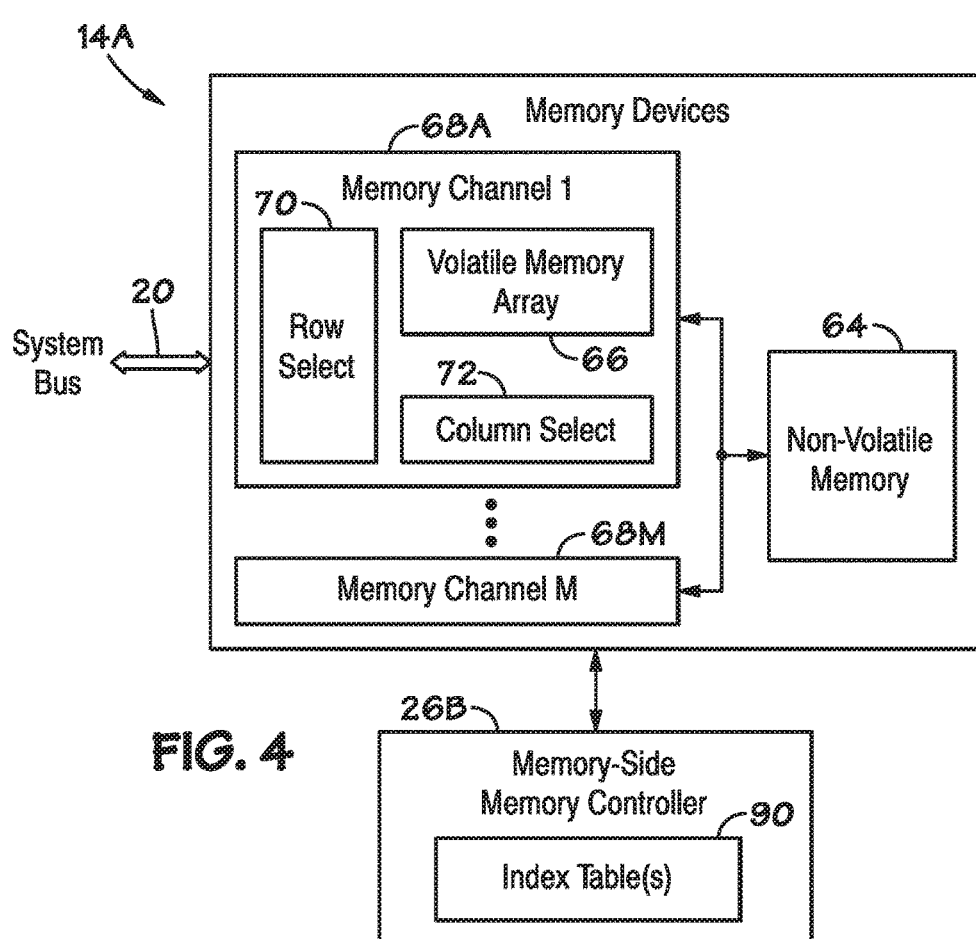
FIG. 4 is a block diagram of an example of the memory sub-system of FIG. 1 that utilizes one or more index tables, in accordance with an embodiment of the present disclosure.

To help illustrate, an example of a memory sub-system 14A, which includes a memory-side memory controller 26B, is shown in FIG. 4. As described above, in some embodiments, memory devices 18 implemented in a memory sub-system 14 may include volatile memory and/or non-volatile memory 64. For example, the non-volatile memory 64 may include one or more flash (e.g., NAND) memory devices 18A, one or more phase-change memory (e.g., 3D XPoint™) memory devices 18A, one or more ferroelectric random access memory (FeRAM) device 18A, or any combination thereof. Additionally or alternatively, the volatile memory may include one or more dynamic random-access memory (DRAM) devices 18A and/or one or more static random-access memory (SRAM) devices 18A.

Moreover, as described above, the volatile memory implemented in a memory sub-system 14 may be organized into one or more memory arrays. For example, as will be described in more detail below, a memory sub-system 14 may utilize an index table memory array. Additionally, as in the depicted embodiment, the memory sub-system 14A may include one or more main memory arrays 66, for example, separate (e.g., distinct) from the index table memory array.

Furthermore, as in the depicted embodiment, a main memory array 66 may be implemented in each memory channel 68 in the memory sub-system 14A. For example, a first main memory array 66 may be implemented in a first memory channel 68A and an Mth main memory array 66 may be implemented in an Mth memory channel 68M. To facilitate accessing (e.g., reading from and/or writing to) its main memory array 66, as in the depicted embodiment, a memory channel 68 may include row select (e.g., decoder) circuitry 70 and column select circuitry 72, for example, coupled to rows and columns of the main memory array 66 respectively.

Figure 5:
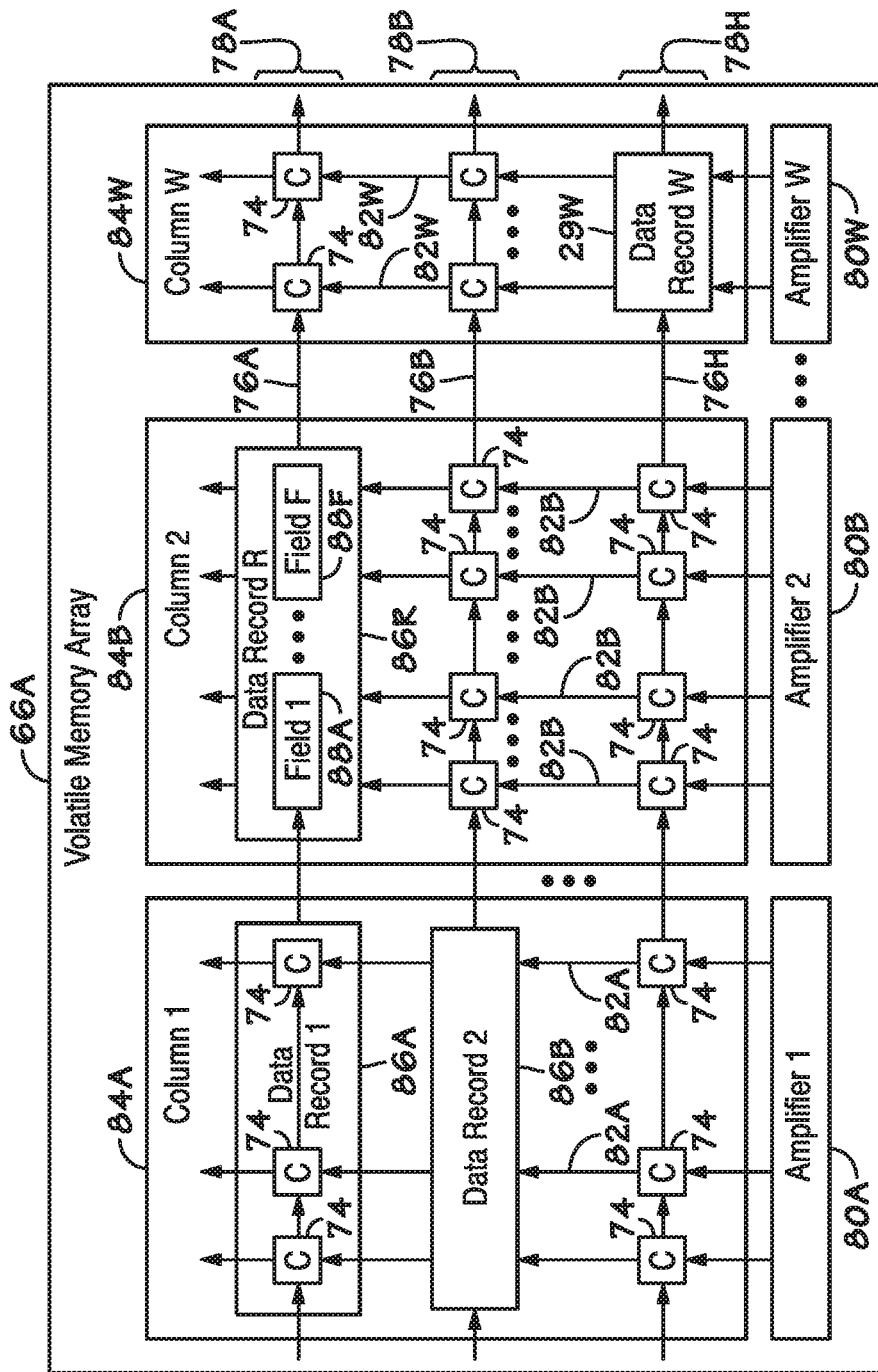
FIG. 5 is a block diagram of an example volatile memory array that may be implemented in the memory sub-system of FIG. 4, in accordance with an embodiment of the present disclosure.

To help illustrate, an example of a memory array 66A, which may be used to implement a main memory array 66 in a memory channel 68, is shown in FIG. 5. As in the depicted example, the memory array 66A may include memory cells 74 coupled to word lines 76 formed in a first (e.g., horizontal) direction. In other words, a memory cell row 78 may include each of the memory cells 74 coupled to a corresponding word line 76. For example a first memory cell row 78A may include each of the memory cells 74 coupled to a first word line 76A, a second memory cell row 78B may include each of the memory cells 74 coupled to a second word line 76B, and so on with an Hth memory cell row 78H including each of the memory cells 74 coupled to an Hth word line 76H.

Additionally, as in the depicted example, the memory cells 74 may be coupled to column amplifiers 80 via bit lines 82 formed in a second (e.g., vertical) direction. In other words, a memory cell column 84 may include each memory cell 74 coupled to a corresponding column amplifier 80. For example, a first memory cell column 84A may include each memory cell 74 coupled to a first column amplifier 80A via first bit lines 82A, a second memory cell column 84B may include each memory cell 74 coupled to a second column amplifier 80B via second bit lines 82B, and so on with a Wth memory cell column 84W including each memory cell 74 coupled to a Wth column amplifier via Wth bit lines 82W.

In any case, a memory cell 74 generally includes a switching component, such as a metal-oxide-semiconductor field-effect transistor (MOSFET), and a storage component, such as a capacitor. For example, a memory cell 74 may be implemented such that its MOSFET is coupled between a bit line 82 and its storage capacitor and the gate of its MOSFET is coupled to a word line 76. Thus, in some embodiments, each memory cell 74 may be used to store one bit of data. For example, a memory cell 74 may indicate a 1-bit when charge stored in the memory cell 74 results in a voltage greater than a threshold voltage and a 0-bit when charge stored in the memory cell 74 results in a voltage less than the threshold voltage. In other embodiments, a memory cell 74 may be implemented store multiple bits of data. For example, a memory cell 74 in Quad-Level Cell (QLC) NAND memory may be implemented to store two bits of data.

In any case, as in the depicted embodiment, the memory cells 74 in the memory array 66A may be grouped into storage locations to store data records (e.g., blocks) 86. For example, a first data record 86A may be stored at a first storage location including the memory cells 74 in the first memory cell row 78A and the first memory cell column 84A, a second data record 86B may be stored at a second storage location including the memory cells 74 in the second memory cell row 78B and the first memory cell column 84A, and so on. In other words, in some embodiments, multiple data records 86 may be stored as a (e.g., contiguous) block in the memory array 66A, for example, at successive memory addresses.

Additionally or alternatively, one or more data records 86 may be stored at non-contiguous memory addresses (e.g., in a sparse array). For example, an Rth data record 86R may be stored at an Rth storage location including the memory cells 74 in the first memory cell row 78A and the second memory cell column 84B and/or a Wth data record 86W may be stored at a Wth storage location including the memory cells in the Hth memory cell row 78H and the Wth memory cell column 84W. To facilitate accessing storage locations in the memory array 66A, the memory cell rows 78 may each be identified via a corresponding row address (e.g., physical memory address) and the memory cell columns 84 may each be identified via a column address (e.g., physical memory address).

Additionally, to facilitate accessing storage locations in the memory array 66A, as described above, row select circuitry 70 may be connected to rows of the memory array 66A. In other words, the row select circuitry 70 may be coupled the first memory cell row 78A via the first word line 76A, the second memory cell row 78B via the second word line 76B, and so on with the row select circuitry 70 coupled to the Hth memory cell row 78H via the Hth word line 76H. Thus, to enable reading and/or writing a memory cell 74, row select circuitry 70 may activate the memory cell 74, for example, by outputting an activation (e.g., logic high) signal via a corresponding word line 76 that causes the switching component of the memory cell 74 to electrically couple the storage component of the memory cell 74 to a corresponding bit line 82.

Moreover, as described above, column select circuitry 72 may be coupled to columns of the memory array 66A. In other words, the column select circuitry 72 may be coupled to the first memory cell column 84A via the first bit lines 82A and the first column amplifier 80A, the second memory cell column 84B via second bit lines 82B and the second column amplifier 80B, and so on with the column select circuitry 72 coupled to the Wth memory cell column 84W via the Wth bit lines 82W and the Wth column amplifier. In some embodiments, a column amplifier 80 may include a driver to facilitate storing (e.g., writing) data into the memory cells 74 and/or a sense amplifier to facilitate outputting (e.g., reading) data from the memory cells 74.

In some embodiments, the column select circuitry 72 may selectively enable reading from and/or writing to a memory cell column 84, for example, by outputting a column select to a corresponding column amplifier 80. In other words, to read data (e.g., first data record 86A and/or second data record 86B) from the first memory cell column 84A and/or to write data record 86A to the first memory cell column 84A, the column select circuitry 72 may output a column select (e.g., logic high) signal to the first column amplifier 80A. Additionally, to read data (e.g., Rth data record 86R) from the second memory cell column 84B and/or to write data to the second memory cell column 84B, the column select circuitry 72 may output a column select signal to the second column amplifier 80B. Furthermore, to read data (e.g., Wth data record 86W) from the Wth memory cell column 84W and/or to write data to the Wth memory cell column 84W, the column select circuitry 72 may output a column select signal to the Wth column amplifier 80W.

In any case, as described above, a data record 86 may include one or more data fields 88. For example, as in the depicted embodiments, one or more of the data records 86 may include a first data field 88A and an Fth data field 88F. As described above, in some embodiments, data records 86 may utilize a data structure that allocates specific bit positions for indicating specific data fields 88. For example, the data structure may allocate bits [0, X] in a data record 86 for indicating a name field 88, bits [X+1, Y] in the data record 86 for indicating a street address field 88, and bits [Y+1, Z] in the data record 86 for indicating a zip code field 88. As described above, in some embodiments, one or more data fields 88 may be indexed, for example, to facilitate accessing corresponding data records 86 in a sorted order.

Figure 6:
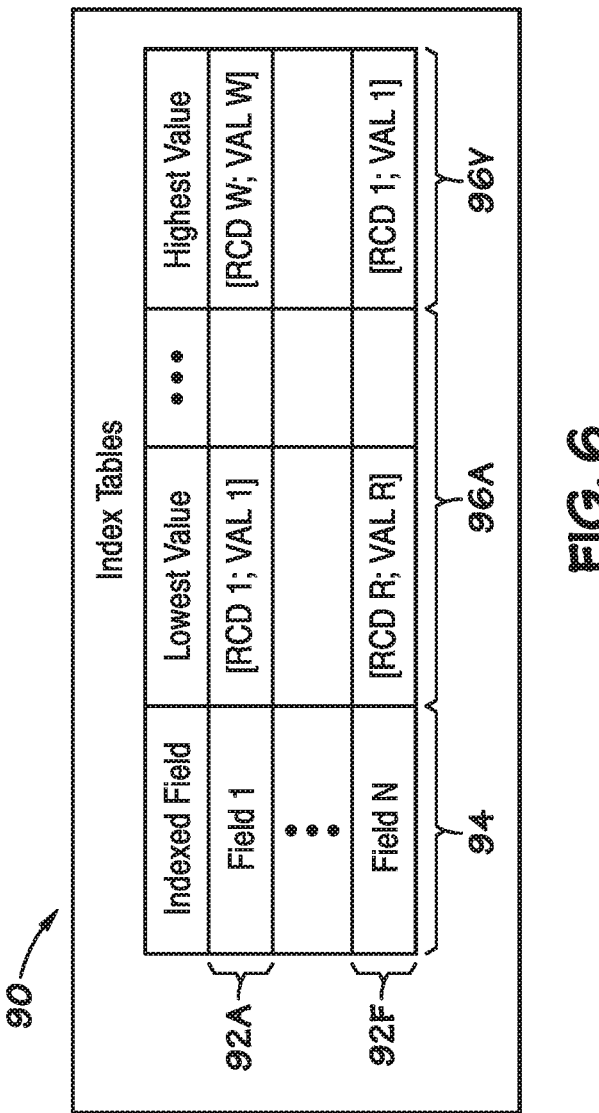
FIG. 6 is a diagrammatic representation of index tables that may be used by the memory sub-system of FIG. 4, in accordance with an embodiment of the present disclosure.

Returning to the memory sub-system 14A of FIG. 6, to facilitate accessing data in a sorted order, the memory-side memory controller 26B may utilize one or more index table 90. In some embodiments, each index table 90 may correspond with a different data field 88 included in one or more data records 86 stored in the memory sub-system 14A. For example, the index tables 90 may include a name index table when one or more data records 86 include a name field 88, a street address index table when one or more data records 86 include a street address field 88, and/or a zip code index table when one or more data records 86 include a zip code field 88.

Additionally, in some embodiments, an index table 90 may include one or more index entries that each correspond with a data record 86 that includes a corresponding data field 88. For example, the name index table 90 may include a first name index entry corresponding with the first data record 86A when the first data records 86A includes the name field, a second name index entry corresponding with the second data record 86B when the second data records 86B includes the name field, and so on. Additionally, the street address index table 90 may include a first street address index entry corresponding with the first data record 86A when the first data records 86A includes the street address field 88, a second street address index entry corresponding with the second data record 86B when the second data records 86B includes the street address field 88, and so on. Furthermore, the zip code index table 90 may include a first zip code index entry corresponding with the first data record 86A when the first data records 86A includes the zip code field 88, a second zip code index entry corresponding with the second data record 86B when the second data records 86B includes the zip code field 88, and so on.

To facilitate identifying a corresponding data record 86, in some embodiments, an index entry may identify the storage location of the corresponding data record 86, for example, via a pointer to memory addresses in the memory sub-system 14. In other words, a first index entry corresponding with the first data record 86A may indicate the storage location of the first data records 86A in the memory sub-system 14, a second index entry corresponding with the second data record 86B may indicate storage location of the second data records 86B in the memory sub-system 14, and so on. Additionally, to facilitate sorting, in some embodiments, an index entry may indicate the value of a corresponding data field 88. For example, the first zip code index entry may indicate the value of the zip code field 88 in the first data record 86A, the second zip code index entry may indicate the value of the zip code field 88 in the second data record 86B, and so on.

To help further illustrate, a diagrammatic representation of example index tables 90 is shown in FIG. 6. As depicted, the index tables 90 may include an indexed data field column 94 and one or more index entry position columns 96, which each corresponds with an index entry position. Additionally, as in the depicted example, the index tables 90 may include index table rows 92, which each correspond to a different index table 90.

In other words, an index table row 92 may indicate a corresponding indexed data field (e.g., access index) in the indexed data field column 94. For example, the indexed data field column 94 in a first index table row 92A may indicate that the first index table row 92A corresponds with the first data field 88A. Additionally, the indexed data field column 94 in an Fth index table row 92F may indicate that the Fth index table row 92F corresponds with the Fth data field 88F.

Moreover, an index table row 92 may indicate index entries each corresponding with a data record 85 that includes the indexed data field in the index entry position columns 96. For example, the index entry position columns 96 in the first index table row 92A may include an index entry corresponding with a first data record 86A when the first data record 86A includes the first data field 88A, an index entry corresponding with the Wth data record 86W when the Wth data record 86W includes the first data field 88A, and so on. Additionally, the index entry position columns 96 in the Fth index table row 92F may include an index entry corresponding with the Rth data record 86R when the Rth data record 86R includes the Fth data field 88F, an index entry corresponding with the first data record 86A when the first data record 86A includes the first data field 88A, and so on.

Moreover, as described above, an index entry in an index table 90 may indicate storage location of a corresponding data record 86 in the memory sub-system 14 and the value of a corresponding indexed data field 88 in the data record 86. For example, the index entry corresponding with the first data record 86A in the first index table row 92A may identify the storage location of the first data record 86A and the value of the first data field 88A indicated in the first data record 86, the index entry corresponding with the Wth data record 86W in the first index table row 92A may identify the storage location of the Wth data record 86W and the value of the first data field 88A indicated in the Wth data record 86W, and so on. Additionally, the index entry corresponding with the Rth data record 86R in the Fth index table row 92F may identify the storage location of the Rth data record 86F and the value of the Fth data field 88F indicated in the Rth data record 86R, the index entry corresponding with the first data record 86A in the Fth index table row 92F may identify the storage location of the first data record 86A and the value of the Fth data field 88F indicated in the first data record 86A.

As described above, in some embodiments, indicating the value of an indexed data field 88 in corresponding index entries may facilitate improving sorted access to corresponding data records 86A. In particular, in some embodiments, indicating the value of an indexed data field 88 in corresponding index entries may enable the memory-side memory controller 26B to sort the corresponding data records 86 in ascending order, descending order, or any other suitable order, for example, merely by adjusting index entry position of the index entries without adjusting the actual data records 86. For example, in the depicted example, index entries may be sorted in ascending order by indicating an index entry that includes the lowest (e.g., smallest) value of the indexed data field in a first index entry position in the first index entry position column 106A and the index entry that includes the highest (e.g., largest) value of the indexed data field in a Vth (e.g., last) index entry position in the Vth (e.g., last) index entry position column 106V.

In other words, by reading (e.g., traversing) the index entry position columns 96 included in an index table row 92, a memory controller 26 (e.g., memory-side memory controller 26B) may determine the storage location of data records 86 in the memory sub-system 14 that include a corresponding indexed data field. For example, by reading the index entry position columns 96 in the first index table row 92A, the memory controller 26 may determine the storage location of the first data record 86A and the storage location of the Wth data record 86W and, thus, that they both include the first data field 88A. Additionally, by reading the index entry position columns 96 in the Fth index table row 92F, the memory controller 26 may determine the storage location of the Rth data record 86R and the storage location of the first data record 86A and, thus, that they both include the Fth data field 88F. In any case, as described above, in some embodiments, the index tables 90 more be stored in dedicated memory, for example, implemented in a separate storage (e.g., memory) device and/or in an index table memory array distinct (e.g., separate) from the one or more main memory arrays 66.

Figure 7:
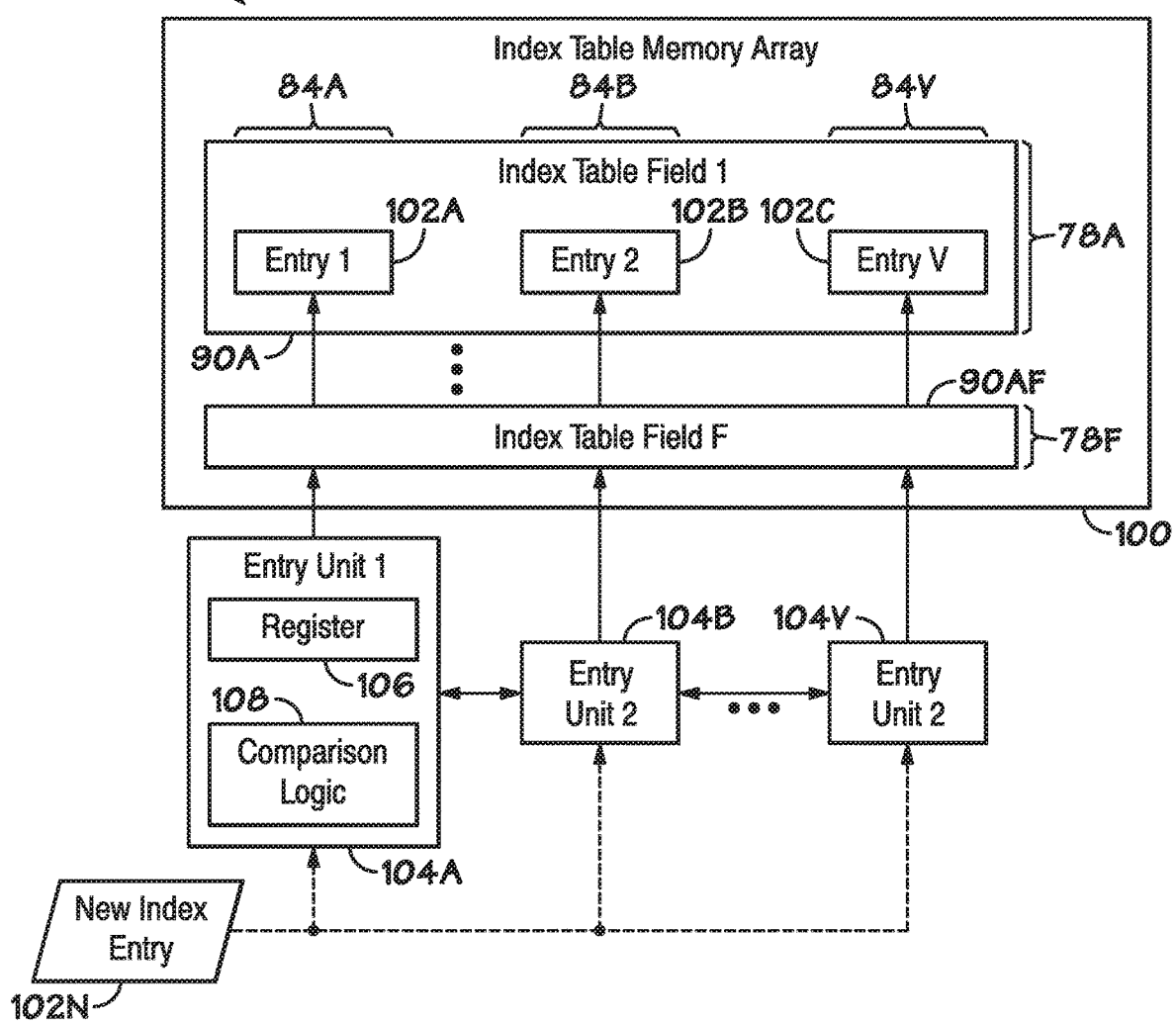
FIG. 7 is a block diagram of an index table memory array storing the index tables of FIG. 6 and a portion of a memory controller coupled to the index table memory array, in accordance with an embodiment of the present disclosure.

To help illustrate, an example of a portion 108 a memory sub-system 14 including an index table memory array 100 is shown in FIG. 7. As in the depicted embodiment, index tables 90 may be each be stored in a memory cell row 78 of the index table memory array 100. For example, a first index table 90A may be stored in a first memory cell row 78A of the index table memory array 100 and an Fth index table 90F may be stored in an Fth memory cell row 78F of the index table memory array 100. In other words, the first index table 90A may corresponding with the first index table row 92A and the Fth index table 90F may corresponding with the Fth index table row 92F.

Additionally, as in the depicted embodiment, index entries 102 may each be stored in in a memory cell column 84 of the index table memory array 100. For example, a first index entry 102A may be stored in a first memory cell column 84A of the index table memory array 100, a second index entry 102B may be stored in a second memory cell column 84B of the index table memory array 100, and so on with a Vth index entry 102V stored in a Vth memory cell column 84V of the index table memory array 100. In other words, in some embodiments, the memory cell columns 84 in the index table memory array 100 may each correspond with an index entry position column 96 and, thus, a corresponding index entry position. For example, since stored in the first memory cell column 84A of the first memory cell row 78A, a memory controller 26 (e.g., memory-side memory controller 26B) may determine that the first index entry 102A is included in the first index table 90A at a first (e.g., smallest or lowest) index entry position. Additionally, since stored in the Vth memory cell column 84V of the first memory cell row 78A, the memory controller 26 may determine that the Vth index entry 102V is included in the first index table 90A at a Vth (e.g., largest or highest) index entry position.

To facilitate accessing the index entry positions, as in depicted embodiment, an entry unit 104 may be coupled to each memory cell column 84 in the index table memory array 100, for example, via a corresponding column amplifier 80. In other words, a first entry unit 104A may be coupled to the first memory cell column 84A in the index table memory array 100, a second entry unit 104B may be coupled to the second memory cell column 84B in the index table memory array 100, and so on with a Vth entry unit 104V coupled to the Vth memory cell column 84V in the index table memory array 100. Additionally, as in the depicted embodiment, different entry units 104 may be communicatively coupled, for example, to enable shifting data therebetween.

In some embodiments, an entry unit 104 corresponding with a memory cell column 84 may be communicatively coupled to an entry unit 104 corresponding with an adjacent memory cell column 84. For example, the first entry unit 104A may only be communicatively coupled to the second entry unit 104B and/or the Vth entry unit 104V may only be communicatively coupled to a V−1th entry unit 104, which corresponds to a V−1th memory cell column 84 in the index table memory array 100. On the other hand, the second entry unit 104B may be communicatively coupled to both the first entry unit 104A and a third entry unit 104, which corresponds to a third memory cell column 84 in the index table memory array 100. Additionally, in some embodiments, the entry units 104 may be included in a memory controller 26, such as a memory-side memory controller 26B implemented in a memory sub-system 14.

In any case, as will be described in more detail below, an entry unit 104 (e.g., memory controller 26) may perform data processing operations (e.g., functions), for example, to facilitate updating an index table 90 by adding a new index entry 102N to the index table 90. However, as described above, processing circuitry implemented to perform more complex data processing operations is generally more highly doped compared to memory circuitry. Additionally, higher doping generally increases likelihood of producing leakage current, which, at least in some instances, may affect operational reliability of a memory sub-system 14, for example, by resulting in corruption of data stored in the memory sub-system 14.

Thus, as in the depicted embodiment, an entry unit 104 may include a register 106 and comparison logic circuitry 108, which, at least in some instances, may be implemented with less doped processing circuitry, for example, compared to the processing sub-system 12 and/or a full blown processor-in-memory (PIM). Using its register 106, an entry unit 104 may store an index entry 102, for example, read from the index table memory array 100. In some embodiments, one or more of the registers 106 may be sixty-four byte registers.

Additionally, using its comparison logic circuitry 108, an entry unit 104 may compare an index entry 102 currently stored in its register 106 with a received (e.g., input) index entry 102, for example, shifted from another entry unit 104 and/or a new index entry 102N to be added to a corresponding index table 90. In some embodiments, the comparison logic circuitry 108 implemented in an entry unit 104 may compare the value of a data field 88 indicated by the index entry 102 stored in its register 106 with the value of the data field 88 indicated by the received index entry 102. For example, the comparison logic circuitry 108 may indicate whether the value of the data field 88 indicated by the received index entry 102 is greater than the value of the data field 88 stored in the register 106 of the entry unit 104. Based at least in part on the comparison, a corresponding index table 90 may be updated, for example, to include the new index entry 102N.

Figure 8:
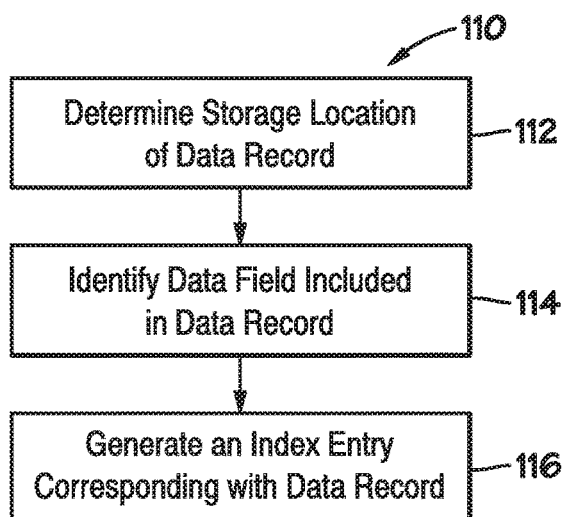
FIG. 8 is a flow diagram of an example process for generating an index entry to be included in an index table, in accordance with an embodiment of the present disclosure.

An example of a process 110 for generating an index entry is described in FIG. 8. Generally, the process 110 includes determining storage location of a data record (process block 112), identifying a data field in the data record (process block 114), and generating an index entry corresponding with the data record (process block 116). Although described in a particular order, which represents a particular embodiment, it should be noted that the process 110 may be performed in any suitable order. Additionally, embodiments of the process 110 may omit process blocks and/or include additional process blocks. Moreover, in some embodiments, the process 110 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26B) may determine the storage location of a data record 86 in a memory sub-system 14 (process block 112). As described above, in some embodiments, the storage location of data may be indicated via a (e.g., virtual and/or physical) memory address at which the data stored, for example, in a main memory array 66 and/or non-volatile memory 64 implemented in the memory sub-system 14. As an illustrative example, with regard to FIG. 5, the memory controller 26 may determine that the first data record 86A is stored at a first row address and column address pairing, which identifies the first memory cell row 78A and the first memory cell column 84A in the memory array 66A.

Returning to the process 110 of FIG. 6, the memory controller 26 may additionally identify a data field 88 included in the data record 86 and determine the value of the data field 88 (process block 114). As described above, in some embodiments, a data record 86 may include one or more data fields 88. Additionally, as described above, in some embodiments, data records 86 may utilize a data structure that allocates specific bit positions for indicating specific data fields 88.

Thus, to facilitate determining the value of the data field 88, the memory controller 26 may determine a data structure used by the data record 86. In some embodiments, the data structure of a data record 86 may be predefined, for example, such that an indication of the data structure is previously stored in the memory sub-system 14. Additionally or alternatively, the data structure of a data record 86 may be explicitly indicated, for example, via metadata (e.g., header data) included with the data record 86 and/or a separate control signal (e.g., command or request) received along with the data record 86.

Based at least in part on the data structure, the memory controller 26 may read bit positions in the data record 86 to determine the value indicated by the data field 88 in the data record 86. For example, when the data structure allocates bits [0, X] for indicating a name field 88 (e.g., first data field 88A), the memory controller 26 may determine the value of the name field 88 by reading bits [0, X] in the data record 86. Additionally, when the data structure allocates bits [X+1, Y] for indicating a street address field 88, the memory controller 26 may determine the value of the address field 88 by reading bits [X+1, Y] in the data record 86. Furthermore, when the data structure allocates bits [Y+1, Z] for indicating a zip code field (e.g., Fth data field 88F), the memory controller 26 may determine the value of the zip code field 88 by reading bits [Y+1, Z] in the data record 86.

Based at least in part on its storage location and the value indicated by its data field 88, the memory controller 26 may generate a (e.g., new) index entry 102 corresponding with the data record 86 (process block 116). As described above, in some embodiments, an index entry 102 may indicate the storage location of a corresponding data record 86 and the value of a corresponding data field 88 included in the data record 86. For example, the memory controller 26 may generate a name index entry 102 to indicate the storage location of the data record 86 and the value of its name field 88. Additionally, the memory controller 26 may generate a street address index entry to indicate the storage location of the data record 86 and the value of its street address field 88. Furthermore, the memory controller 26 may generate a zip code index entry to indicate the storage location of the data record 86 and the value of its zip code field 88. In any case, as described above, to facilitate providing sorted access, an index table 90 may be updated, for example, to add one or more new index entries 102N.

Figure 9:
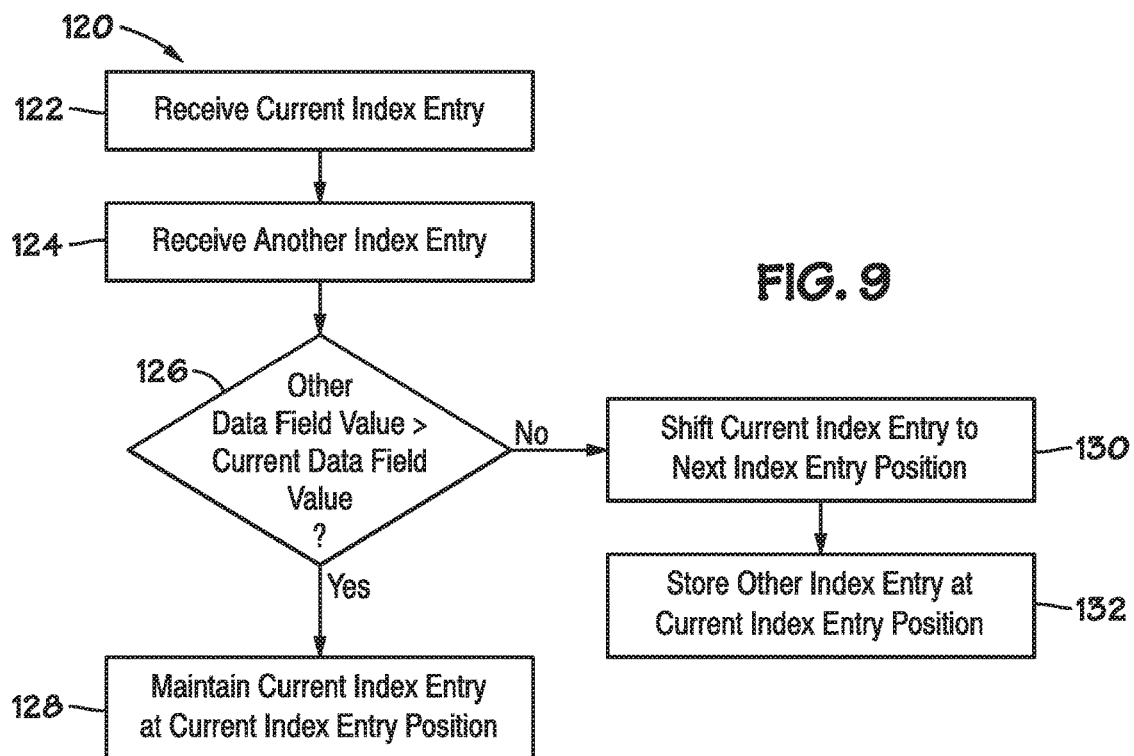
FIG. 9 is a flow diagram of an example process for generating and/or updating an index table, in accordance with an embodiment of the present disclosure.

To help illustrate, an example of a process 120 for generating and/or updating an index table 90, which is sorted in ascending order, is described in FIG. 9. Generally, the process 120 includes receiving a current index entry (process block 122), receiving another index entry (process block 124), determining whether another data field value is greater than a current data field value (decision block 126), and maintaining the current index entry at a current index entry position when the other data field value is greater than the current data field value (process block 128). Additionally, when the other data field value is not greater than the current data field value, the process 120 includes shifting the current index entry to a next index entry position (process block 130) and storing the other index entry at the current index entry position (process block 132).

Although described in a particular order, which represents a particular embodiment, it should be noted that the process 120 may be performed in any suitable order. Additionally, embodiments of the process 120 may omit process blocks and/or include additional process blocks. Moreover, in some embodiments, the process 120 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26B) may receive an index entry 102 currently stored at each index entry position in an index table 90, for example, from the index table memory array 100 via corresponding entry units 104 (process block 122). To help illustrate, with regard to FIG. 7, the first entry unit 104A may receive the first index entry 102A, which is currently stored at the first index entry position in the first index table 90A, from the first memory cell column 84A and store the first index entry 102A in its register 106. Additionally, the second entry unit 104B may receive the second index entry 102B, which is currently stored at the second index entry position in the first index table 90A, from the second memory cell column 84B and store the second index entry 102B in its register 106.

Returning to the process 120 of FIG. 9, in addition to the current index entry 102, the memory controller 26 may receive another index entry 102 (process block 135). In some embodiments, the other index entry 102 may be a new index entry 102N, which is to be added to a corresponding index table 90. Additionally or alternatively, the other index entry 102 may be an index entry 102 received (e.g., shifted) from another entry unit 104. To help illustrate, with regard to FIG. 7, the second entry unit 104B may receive the first index entry 102A from the first entry unit 104A, for example, when the first entry unit 104A determines that the value of the data field 88 indicated in the new index entry 102N is not greater than the value of the data field 88 indicated in the first index entry 102A.

Returning to the process 120 of FIG. 9, the memory controller 26 may then determine whether the value of a data field 88 indicated in the other index entry 102 is greater than the value of the data field 88 indicated in the current index entry 102 (decision block 126). For example, with regard to FIG. 7, the first entry unit 104A may compare the value of the data field 88 indicated in the first index entry 102A with the value of the data field 88 indicated in the new index entry 102N via its comparison logic circuitry 108. Additionally, when the first index entry 102A is shifted to the second entry unit 104B, the second entry unit 104B may compare the value of the data field 88 indicated in the first index entry 102A with the value of the data field 88 indicated in the second index entry 102B via its comparison logic circuitry 108. On the other hand, when the first index entry 102A is not shifted to the second entry unit 104B, the second entry unit 104B may compare the value of the data field 88 indicated in the new index entry 102N with the value of the data field 88 indicated in the second index entry 102B via its comparison logic circuitry 108.

In any case, returning to the process 120 of FIG. 9, the memory controller 26 may maintain the current index entry 102 at its current index entry position when the other data field value indicated in the other index entry 102 is greater than the current data field value indicated in the current index entry 102 (process block 128). On the other hand, when the other data field value is not greater than the current data field value, the memory controller 26 may shift the current index entry 102 to a next index entry position (process block 130) and store the other index entry at the current index entry position (process block 132). For example, with regard to FIG. 7, the first entry unit 104A may output the first index entry 102A to the second entry unit 104B when the data field value indicated in the new index entry 102N is not greater than the data field value indicated in the first index entry 102A, thereby shifting the first index entry 102A from the first index entry position to the second (e.g., next) index entry position in the first index table 90A. Additionally, when the data field value indicated in the new index entry 102N is not greater than the data field value indicated in the first index entry 102A, the first entry unit 104A may overwrite its register 106 with the new index entry 102N, thereby storing the new index entry 102N in the first index entry position of the first index table 90A. In this manner, a memory sub-system 14 may generate and/or update an index table 90, for example, to facilitate providing sorted access to data stored in the memory sub-system 14.

However, as described above, to facilitate generating and/or updating an index table 90, the memory sub-system 14 may perform data processing operations. Although computational complexity of the data processing operations may be limited (e.g., to reduce likelihood of producing leakage current), at least in some instances, performance of the data processing operations is non-instantaneous. To reduce likelihood that such data processing operations will affect data retrieval latency, in some embodiments, the memory sub-system 14 (e.g., memory-side memory controller 26B) may generate and/or update the index table 90 while the processing sub-system is not expected to target corresponding data records 86. For example, the memory sub-system 14 may generate and/or update the index table 90 in response to one or more data records 86 being written to a main memory array 66.

Figure 10:
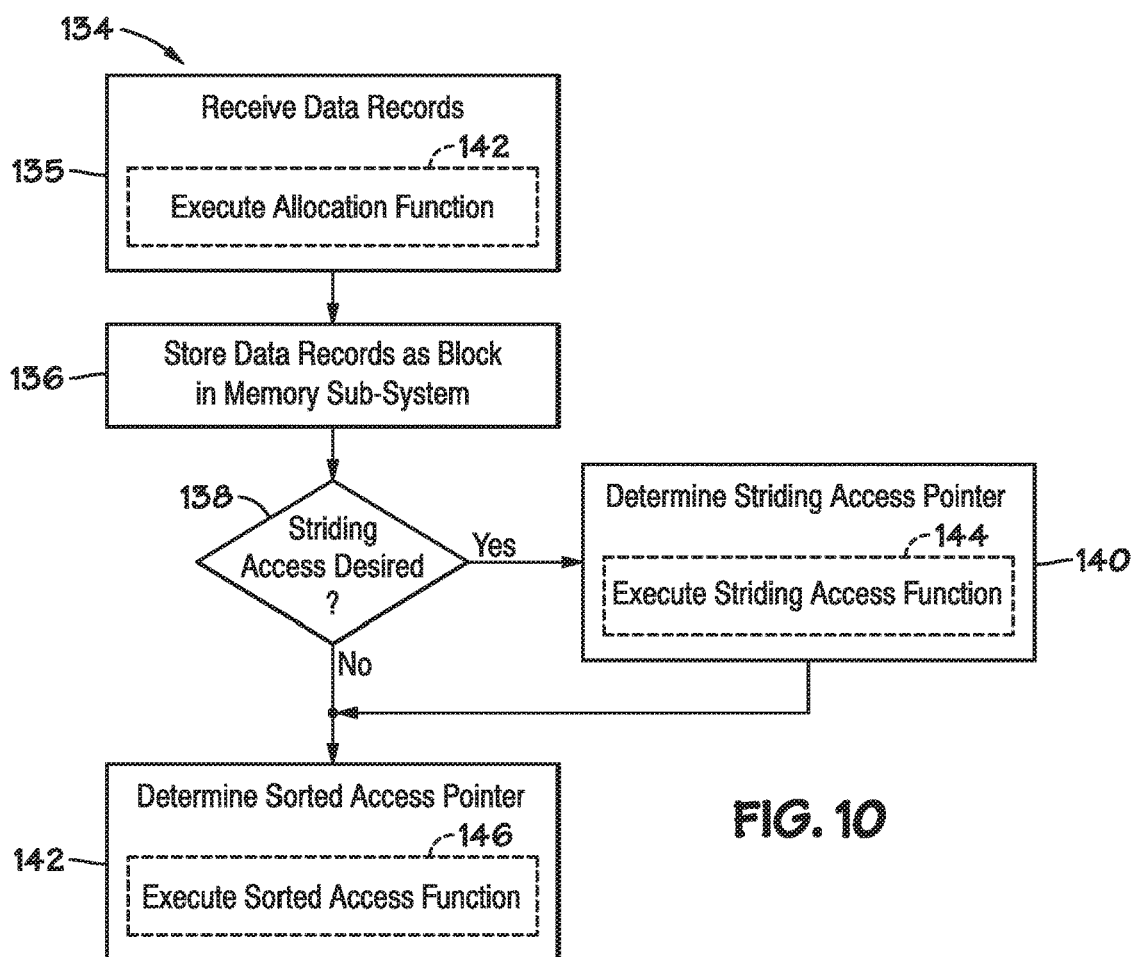
FIG. 10 is a flow diagram of an example process for storing data records in the memory sub-system of FIG. 4, in accordance with an embodiment of the present disclosure.

To help illustrate, an example of a process 134 for operating a memory sub-system 14 to store and provide access to data records 86 is described in FIG. 10. Generally, the process 134 includes receiving data records (process block 135), storing the data records as a block in a memory sub-system (process block 136), determining whether striding access is desired (decision block 138), and determining a sorted access pointer (process block 142). Additionally, when striding access is desired, the process 134 includes determining a striding access pointer (process block 140).

Although described in a particular order, which represents a particular embodiment, it should be noted that the process 134 may be performed in any suitable order. Additionally, embodiments of the process 134 may omit process blocks and/or include additional process blocks. Moreover, in some embodiments, the process 134 may be implemented at least in part by executing instructions stored in a tangible, non-transitory, computer-readable medium, such as memory implemented in a memory controller 26, using processing circuitry, such as a processor implemented in the memory controller 26.

In any case, a memory sub-system 14 may receive data records 86 for storage in its memory devices 18, for example, from a processing sub-system 12 (process block 135). To facilitate storing the data records 86 in its memory devices 18, in some embodiments, the memory sub-system 14 may provide an application programming interface (API) that includes an allocation function. An example of the allocation function is as follows:

$$\text{Alloc}(Ptr, RcdCount, RcdSize, IndexCount, [Index\ Field]^*) \qquad (1)$$

where Alloc ( ) is the allocation function, Ptr is a pointer to a starting storage location in the memory sub-system 14, RcdCount is the number of data records 86 to be included in a block, RcdSize is the size of each of the data records 86, IndexCount is the number of data fields 88 to be indexed, and [IndexField]* indicates one or more specific data fields 88 to be indexed.

In other words, in some embodiments, the memory sub-system 14 (e.g., memory-side memory controller 26B) may execute the allocation function based at least in part on the data structure used by the received data records 86 (process block 142). As described above, in some embodiments, the data structure of a data record 86 may be predefined, for example, such that an indication of the data structure is previously stored in the memory sub-system 14. Additionally or alternatively, the data structure of a data record 86 may be explicitly indicated, for example, via metadata (e.g., header data) included with the data record 86 and/or a separate control signal (e.g., command or request) received along with the data record 86. In any case, by executing the allocation function, the memory sub-system 14 may allocate a contiguous block of memory addresses (e.g., &Ptr+ (RcdCount*RcdSize) for storage of the data records 86, for example, in a main memory 66. Thus, in some embodiments, the memory sub-system 14 may automatically execute the allocation function in response to receipt of the data records 86.

The memory sub-system 14 may then store the data records 86 in the allocated memory addresses, for example, automatically in response to execution of the allocation function (process block 136). In some embodiments, the memory sub-system 14 may store the data records 86 as a contiguous block. In other words, in such embodiments, the memory sub-system 14 may store the data records at successive storage locations (e.g., memory addresses). Additionally, in some embodiments, the memory sub-system 14 may automatically generate one or more index entries 102, for example, in response to a corresponding data record 86 being stored in the memory sub-system 14 (e.g., a main memory array 66).

In some embodiments, the number of index entries 102 generated for a data record 86 may be equal to the value of the IndexCount parameter input to the allocation function. Additionally, in some embodiments, the index entries 102 generated for a data record 86 may each correspond to a different one of the specific data fields 88 indicated by the [IndexField]* parameter input to the allocation function. Furthermore, in some embodiments, the memory sub-system 14 may automatically generate and/or update one or more index tables 90, for example, in response to a corresponding index entry 102 being generated.

To facilitate providing striding access to stored data, in some embodiments, the memory sub-system 14 may determine a striding access pointer (process block 140). As described above, a memory sub-system 14 may provide striding access by identifying specific portions (e.g., one or more data fields 88) of one or more data records 86. In some embodiments, a striding access pointer may identify the storage location of corresponding portions of the data records 86 in the memory sub-system 14. For example, a name striding access pointer may identify the storage locations of the name field 88 in the first data record 86A, the second data record 86B, and so on. Additionally or alternatively, a zip code striding access pointer may identify the storage locations of the zip code field 88 in the first data records 86A, the second data record 86B, and so on.

To facilitate determining a striding access pointer, in some embodiments, the memory sub-system 14 may provide an application programming interface (API) that includes a striding access function. An example of the striding access function is as follows:

$$StPtr = Striding(Ptr, FieldOffset, FieldLength, StrideLength) \qquad (2)$$

where StPtr is the striding access pointer, Striding ( ) is the striding access function, Ptr is a pointer to a starting storage location in the memory sub-system 14, FieldOffset is the starting bit position of a target data field 88 in a data record 86, FieldLength is the size of the target data field 88, and StrideLength is the stride length between successive data records 86. In other words, in some embodiments, the memory sub-system 14 (e.g., memory-side memory controller 26B) may execute the striding access function based at least that in part on the data structure used by the received data records 86 to determine one or more striding access pointers, for example, each corresponding with a data field 88 included in each of the data records 86 (process block 144). To facilitate reducing likelihood that determination of striding access pointers will affect data retrieval latency, in some embodiments, the memory sub-system 14 may automatically execute the striding access function, for example, in response to one or more data records 86 being stored in the memory sub-system 14 (e.g., a main memory array 66).

Additionally or alternatively, to facilitate providing sorted access to stored data, the memory sub-system 14 may determine a sorted access pointer (process block 142). As described above, a memory sub-system 14 may provide sorted access by identifying data records 86 in a sorted order, for example, different from an address order. In some embodiments, a sorted access pointer may identify the storage location of the data records 86 in the memory sub-system 14 in the sorted order. For example, a name sorted access pointer may identify the storage locations of data records 86 in an order based on sorting of the values of the name field 88 included in each of the data records 86. Additionally or alternatively, a zip code sorted access pointer may identify the storage locations of data records 86 in an order based on sorting of the values of the zip code field 88 included in each of the data records 86. In other words, in some embodiments, a sorted access pointer may identify the storage location of a corresponding index table 90, for example, in an index table memory array 100.

To facilitate determining a sorted access pointer, in some embodiments, the memory sub-system 14 may provide an application programming interface (API) that includes a sorted access function. An example of the sorted access function is as follows:

$$SoPtr = Sorted(Ptr, IndexField) \quad (3)$$

where SoPtr is the sorted access pointer, Sorted( ) is the sorted access function, Ptr is a pointer to a starting storage location in the memory sub-system 14, and IndexField indicates a specific data field 88 to be indexed. Thus, in some embodiments, the memory sub-system 14 (e.g., memory-side memory controller 26B) may execute the sorted access function to determine one or more sorted access pointers, for example, each corresponding with an index table 90 and/or a data field 88 included in one or more of the data records 86 (process block 146). To facilitate reducing likelihood that determination of sorted access pointers will affect data retrieval latency, in some embodiments, the memory sub-system 14 may automatically execute the sorted access function, for example, in response one or more index tables 90 being generated and/or updated.

In this manner, a memory sub-system 14 may perform data processing operations with reduced likelihood that the data processing operations will affect (e.g., increase) data retrieval latency, for example, by automatically performing the data processing operations in response to data being stored in the memory sub-system 14 (e.g., a main memory array 66). In fact, in some embodiments, implementing the data processing operations in this manner may facilitate improving (e.g., reducing) subsequent data retrieval latency, for example, by enabling the memory sub-system 14 to identify target data using a striding access pointer and/or a sorted access pointer. Moreover, as described above, providing address management functions in the memory sub-system 14 may facilitate improving operational efficiency of a computing system 10, for example, by enabling a reduction in data communication between the memory sub-system 14 and a processing sub-system 12 in the computing system 10.

Figure 11:
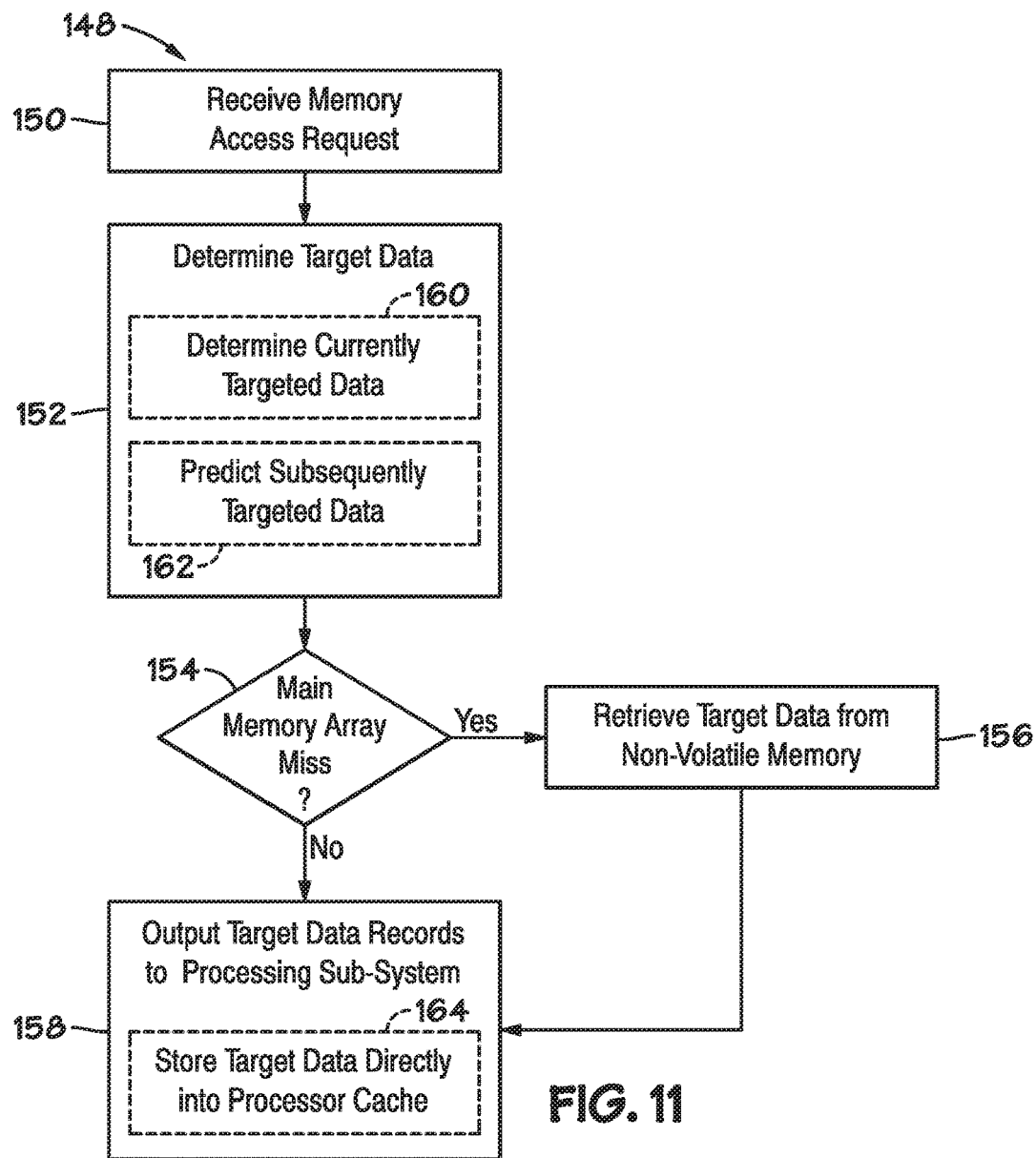
FIG. 11 is a flow diagram of an example process for operating the memory sub-system of FIG. 4, in accordance with an embodiment of the present disclosure.

To help illustrate, an example of a process 148 for operating a memory controller 26, such as a memory-side memory controller 26B, is described in FIG. 11. Generally, the process 148 includes receiving a memory access request (process block 150), determining target data (process block 152), determining whether the target data results in a main memory array miss (decision block 154), and outputting the target data to the processing sub-system (process block 158). Additionally, when the target data results in a main memory array miss, the process 148 includes retrieving the target data from non-volatile memory (process block 156).

Although described in a particular order, which represents a particular embodiment, it should be noted that the process 148 may be performed in any suitable order. Additionally, embodiments of the process 148 may omit process blocks and/or include additional process blocks. Moreover, in some embodiments, the process 148 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26B) may receive a memory access request identifying data currently being targeted by processing circuitry 16 of a computing system 10, for example, from the processing circuitry 16 or a processor-side memory controller 26A (process block 150). In some embodiments, a memory access request may identify target data via its virtual memory address. Additionally or alternatively, the memory access request may identify the target data via its physical memory address, which indicates storage location of the target data in the memory sub-system 14. For example, the physical memory address may include a row address and column address pairing, which identifies a memory cell row 78 and a memory cell column 84 in a main memory array 66 at which the target data is stored.

As such, based at least in part on the memory access request, the memory controller 26 may determine the data currently being targeted by the processing circuitry 16 (process block 160). In some embodiments, the memory controller 26 may additionally or alternatively predict what data will subsequently be targeted by the processing circuitry (process block 162). As described above, at least in some instances, predictively identifying data expected to be subsequently targeted may facilitate improving operational efficiency of the computing system 10, for example, by obviating a subsequent memory access request and/or reducing retrieval time when the data is actually targeted.

Figure 12:
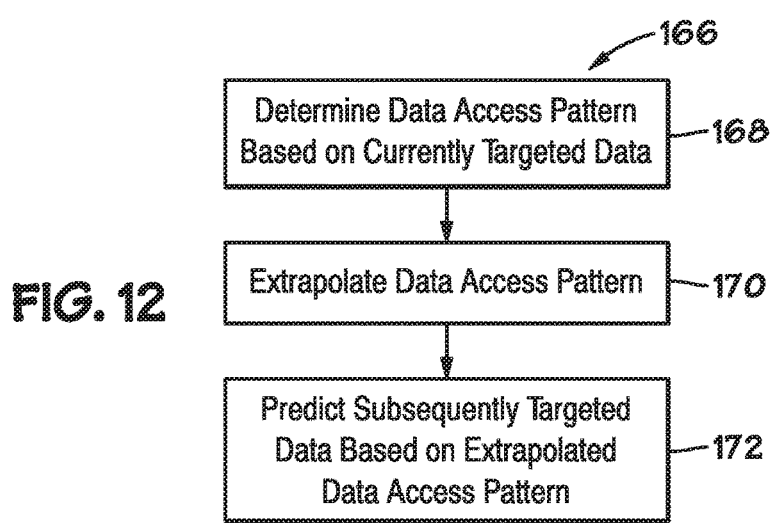
FIG. 12 is a flow diagram of an example process for predictively identifying data that is expected to be subsequently targeted, in accordance with an embodiment of the present disclosure.

To help illustrate, an example of a process 166 for predictively identifying data expected to be subsequently targeted is described in FIG. 12. Generally, the process 166 includes determining a data access pattern based on currently targeted data (process block 168), extrapolating the data access pattern over a control horizon (process block 170), and predicting subsequently targeted data based on the extrapolated data access pattern (process block 172).

Although described in a particular order, which represents a particular embodiment, it should be noted that the process 166 may be performed in any suitable order. Additionally, embodiments of the process 166 may omit process blocks and/or include additional process blocks. Moreover, in some embodiments, the process 166 may be implemented at least in part by executing instructions stored in a tangible, non-transitory, computer-readable medium, such as memory implemented in a memory controller 26, using processing circuitry, such as a processor implemented in the memory controller 26.

Accordingly, in some embodiments, a memory controller 26 (e.g., memory-side memory controller 26B) may determine a data access pattern based at least in part on what data is currently being targeted (process block 168). As described above, a memory access request may identify data currently being targeted, for example, by processing circuitry 16 implemented in a processing sub-system 12. In other words, in some embodiments, the memory controller 26 may determine the data access pattern based at least in part on one or more corresponding memory access requests.

Additionally, as described above, in some embodiments, the processing sub-system 12 may identify data from multiple data records 86 using a single memory access request. For example, a first memory access request may indicate a target access index and a vector [N, M] of target index entry positions. Accordingly, the memory controller 26 may determine that the first memory access request results in a first data access pattern, which targets data records 86 corresponding with index entries 102 at an N+1th index entry position through an M+1th index entry position in an index table 90 corresponding with the target access index. Additionally or alternatively, a second memory access request may indicate the storage location of a block of data records 86 and a targeted data field 88 in each of the data records 86. Accordingly, the memory controller 26 may determine that the second memory access request results in a second data access pattern, which targets a specific data field 88 in each the data record 86 stored in the block.

In any case, the memory controller 26 may then extrapolate the data access pattern over an upcoming control horizon (process block 170). In some embodiments, the control horizon may be a time period (e.g., one or more clock cycles) from a current time to a future time at which another memory access request is expected to be received. In other words, by extrapolating the data access pattern, the memory controller 26 may predict what data will subsequently be targeted (process block 172). For example, by extrapolating the first data access pattern resulting from the first memory access request, the memory controller 26 may predict that the processing circuitry 16 will subsequently target data records 86 corresponding with a vector [M+1, 2M−N+1] of index entry positions in an index table 90 corresponding with the target access index.

In addition to the extrapolated data access pattern, in some embodiments, the memory controller 26 may predict what data will subsequently be targeted based at least in part on the data structure used by the data records 86 stored in the memory sub-system 14. For example, by extrapolating the second data access pattern resulting from the second memory access request, the memory controller 26 may predict that the processing circuitry 16 will subsequently target another data field 88 in each of the data records 86 stored in the block. Additionally, based at least in part on the data structure used by the data records 86, the memory controller 26 may predict that the other data field 88 is a data field 88 adjacent the data field 88 targeted by the second memory access request. In this manner, a memory sub-system 14 may predictively identify data expected to be subsequently targeted, for example, by processing circuitry 16 implemented in a processing sub-system 12.

Returning to the process 148 of FIG. 11, the memory controller 26 may determine whether the (e.g., current and/or predicted) target data results in a main memory array miss (decision block 154). As described above, in some embodiments, the memory controller 26 may determine the storage location of data in the memory sub-system 14 based at least in part on a (e.g., virtual and/or physical) memory address associated with the data. For example, when a corresponding memory address is implemented in a main memory array 66, the memory controller 26 may determine that the target data does not result in a main memory array miss and, thus, instruct the memory sub-system 14 to retrieve (e.g., read) the target data from the main memory array 66. On the other hand, when the corresponding memory address is not implemented in any of the main memory arrays 66, the memory controller 26 may determine that the target data results in a main memory array miss and, thus, instruct the memory sub-system 14 to retrieve (e.g., read) the targeted data from non-volatile memory 64 (process block 156).

In any case, after retrieval from the memory devices 18, the memory controller 26 may instruct the memory sub-system 14 to output the target data to the processing sub-system 12 via the system bus 20 (process block 158). To facilitate further improving operational efficiency, in some embodiments, the memory sub-system 14 may store the target data directly into a processor-side cache 22, for example, automatically in response to the memory access request and/or without separate (e.g., further) instructions from the processing sub-system 12 (process block 164). In other words, in some embodiments, the memory sub-system 14 may preemptively store data expected to be subsequently targeted directly into a processor-side cache 22, which, at least in some instances, may facilitate further improving operational efficiency by enabling the data to be provided from the processor-side cache 22 when the data is actually targeted.

However, as described above, the processing sub-system 12 may also control data storage in its processor-side caches 22, for example, via a processor-side memory controller 26A. As such, in some embodiments, after the target data is stored in the processor-side cache 22, the memory controller 26 may output a control signal to the processing sub-system 12, which indicates that the targeted data has been successfully stored in the processor-side cache 22 and, thus, is ready for processing and/or execution. Moreover, at least in some instances, directly storing target data into the processor-side cache 22 may conflict with the data storage control implemented in the processing sub-system 12. For example, predictively storing data expected to be subsequently targeted directly into the processor-side cache 22 may inadvertently overwrite other data that is still being used by the processing sub-system 12 and, thus, may result in a processor-side cache miss when the other data is targeted. To facilitate reducing likelihood that such conflicts will affect data retrieval latency, in some embodiments, the memory sub-system 14 may directly store targeted data into a processor-side cache 22 implemented in a higher cache level 30, such as an L3 processor-side cache 22 and/or a shared processor-side cache 34 implemented in the Kth cache level 30K. In this manner, a memory sub-system 14 may operate to provide target data to a processing sub-system 12.

Returning to the process 46 of FIG. 3, after the processing sub-system 12 requests the target data, the memory controller 26 (e.g., processor-side memory controller 26A) may determine whether the target data has been received from the memory sub-system 14 (decision block 58). To facilitate improving operational efficiency, in some embodiments, the processing circuitry 16 may continue performing other operations while the processing sub-system 12 waits for the return of the target data. Additionally, in some embodiments, the memory controller 26 may determine that the target data has been received when a control signal, which indicates that the target data has been successfully stored in the processor-side caches 22, is received from the memory sub-system 14.

In any case, after the target data is received, the memory controller 26 may instruct the processing sub-system 12 to supply the target data to the processing circuitry 16, for example, from the processor-side caches 22 (process block 52). In some embodiments, a processor-side cache 22 may output a cache line with tag metadata that matches the target tag metadata value expected to be associated with the target data. When stored in a higher level cache (e.g., shared processor-side cache 34), in some embodiments, the target data may pass through one or more lower level caches (e.g., private processor-side caches 32) before reaching the processing circuitry 16.

One or more specific embodiments of the present disclosure are described herein and depicted in the corresponding figures. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An apparatus comprising a memory system configured to be communicatively coupled to a processor via one or more data buses, wherein the memory system comprises:
   a main memory array configured to store first data at a first storage location and second data at a second storage location; and
   a first memory controller configured to:
      receive a memory access request that requests return of the first data and the second data when the first data and the second data are targeted by the processor;
      determine a data access pattern resulting from the memory access request;
      determine an access pointer that identifies the first storage location of the first data in the main memory array and the second storage location of the second data in the main memory, wherein the access pointer comprises a striding access pointer when the data access pattern is a striding access pattern and a sorted access pointer when the data access pattern is a sorted access pattern; and
      instruct the memory system to use the access pointer to identify and output the first data and the second data via the one or more data buses to enable processing circuitry implemented in the processor to perform an operation based at least in part on the first data and the second data.

2. The apparatus of claim 1, wherein:
   the main memory array is configured to store a plurality of data records that each comprises a data field, wherein the first data is indicated in the data field of a first data record of the plurality of data records and the second data is indicated in the data field of a second data record of the plurality of data records; and
   the first memory controller is configured to determine that the data access pattern resulting from the memory access request is the striding access pattern when the memory access request identifies the data field corresponding with the first data and the second data as a targeted portion of the plurality of data records.

3. The apparatus of claim 2, wherein the first memory controller is configured to:
   determine a data structure used by each of the plurality of data records stored in the main memory array, wherein the data structure specifies bit depth of each data record in the plurality of data records and bit positions in each data record of the plurality of data records allocated to indicate the data field; and
   determine the striding access pointer by executing a striding access function based at least in part on the data structure used by each of the plurality of data records when the data access pattern resulting from the memory access request is the striding access pattern.

4. The apparatus of claim 1, wherein:
   the main memory array is configured to store a plurality of data records that each comprises a data field, wherein a first data record of the plurality of data records comprises the first data and a second data record of the plurality of data records comprises the second data; and
   the first memory controller is configured to determine that the data access pattern resulting from the memory access request is the sorted access pattern when the memory access request identifies the data field as a target access index and a vector of target index entry positions in an index table corresponding with the data field.

5. The apparatus of claim 4, wherein:
   the memory system comprises an index table memory array separate from the main memory array; and
   the first memory controller is configured to:
      store the index table corresponding with the data field at a third storage location in the index table memory array; and
      determine the sorted access pointer by executing a sorted access function, wherein the sorted access pointer indicates the third storage location of the index table in the index table memory array.

6. The apparatus of claim 5, wherein, when the data access pattern is the sorted access pattern, the first memory controller is configured to:
   determine the index table by reading the index table from the third storage location in the index table memory array indicated by the sorted access pointer; and
   determine the first storage location of the first data and the second storage location of the second data by reading index entries indicated at the vector of target index entry positions in the index table.

7. The apparatus of claim 1, wherein:
   the memory system is configured to receive a plurality of data records to be stored in the main memory array; and
   the first memory controller is configured to:

determine a data structure used by each of the plurality of data records, wherein the data structure specifies a size of each data record of the plurality of data records, a data field included in each data record of the plurality of data records, and a plurality of bit positions in each data record of the plurality of data records used to indicate the data field;

instruct the memory system to allocate a contiguous block of memory addresses in the main memory array by executing an allocation function based at least in part on the data structure used by each of the plurality of data records in response to receipt of the plurality of data records; and instruct the memory system to store the plurality of data records in the contiguous block of memory addresses in the main memory array in response allocation of the contiguous block of memory addresses.

8. The apparatus of claim 7, wherein the first memory controller is configured to determine the striding access pointer by executing a striding access function based at least in part on the data structure used by each of the plurality of data records in response to storage of the plurality of data records in the main memory array.

9. The apparatus of claim 7, wherein the first memory controller is configured to:

generate a plurality of index entries each associated with a corresponding data record in the plurality of data records in response to storage of the plurality of data records in the main memory array;

determine an index table to be stored at a third storage location in an index table memory array distinct from the main memory array, wherein the index table corresponds with the data field and comprises the plurality of index entries; and determine the sorted access pointer by executing a sorted access function in response to determination of the index table, wherein the sorted access pointer indicates the third storage location of the index table in the index table memory array.

10. The apparatus of claim 1, wherein the processor comprises one or more caches integrated with the processing circuitry and a second memory controller configured to:

determine whether the first data is currently stored in the one or more caches implemented in the processor;

determine that the first data is not currently cached in the processor when the first data is not currently stored in the one or more caches implemented in the processor; and output the memory access request via the one or more data buses when the first data is not currently cached in the processor.

11. A method comprising:

determining, using a memory controller, a data structure used by each data record of a plurality of data records to be stored in a memory sub-system;

allocating, using the memory controller, a block of memory addresses in the memory sub-system in response to the memory sub-system receiving the plurality of data records from a processing sub-system by executing an allocation function based at least in part on the data structure used by each data record of the plurality of data records;

determining, using the memory controller, a first access pointer that identifies a portion of the plurality of data records in the memory sub-system in response to storage of the plurality of data records in the block of memory addresses; and instructing, using the memory controller, the memory sub-system to output the portion of the plurality of data records to the processing sub-system using the first access pointer when a subsequently received memory access request targets the portion of the plurality of data records to enable the processing sub-system to perform a first operation based at least in part on the portion of the plurality of data records.

12. The method of claim 11, wherein:

determining the first access pointer comprises determining a striding access pointer that identifies storage locations of a target data field included in each of the plurality of data records by executing a striding access function based at least in part on the data structure used by each data record of the plurality of data records; and instructing the memory sub-system to output the portion of the plurality of data records comprises instructing the memory sub-system to output the portion of the plurality of data records from the storage locations of the target data field identified by the striding access pointer.

13. The method of claim 11, wherein:

determining the first access pointer comprises determining a sorted access pointer that identifies storage locations of a subset of data records from the plurality of data records by executing a sorted access function; and instructing the memory sub-system to output the portion of the plurality of data records comprises instructing the memory sub-system to output the portion of the plurality of data records from the storage locations of the subset of data records identified by the sorted access pointer.

14. The method of claim 13, wherein determining the sorted access pointer comprises:

generating a plurality of index entries each associated with a corresponding data record in the plurality of data records, wherein each index entry of the plurality of index entries indicates a first storage location of the corresponding data record;

storing the plurality of index entries at a second storage location in the memory sub-system as an index table; and determining the sorted access pointer to identify the second storage location of the index table in the memory sub-system by executing the sorted access function.

15. The method of claim 14, comprising:

selecting the index table as a target index table when the subsequently received memory access request identifies a data field corresponding with the index table as a target access index;

determining the index table by reading the second storage location in the memory sub-system using the sorted access pointer;

identifying the first storage location of each data record in the subset of data records by reading a subset of the plurality of index entries indicated at target index entry positions in the index table identified by the subsequently received memory access request; and instructing the memory sub-system to output the portion of the plurality of data records by outputting the subset of data records from the first storage location in the memory sub-system.

16. A computing system comprising a memory sub-system, wherein the memory sub-system comprises:

one or more memory devices configured to implemented a first memory array and a second memory array distinct from the first memory array, wherein:
- the first memory array is configured to store a first data record comprising a first data field at a first storage location in the first memory array; and
- the second memory array is configured to store a first index table corresponding with the first data field at a second storage location in the second memory array, wherein the first index table comprises a first index entry that indicates the first storage location of the first data record in the first memory array and a first value of the first data field indicated in the first data record; and a memory-side memory controller communicatively coupled to the one or more memory devices, wherein the memory-side memory controller is configured to:
- instruct the one or more memory devices to store a second data record comprising the first data field at a third storage location in the first memory array;
- generate a second index entry that indicates the third storage location of the second data record in the first memory array and a second value of the first data field indicated in the second data record;
- update the first index table to include the second index entry based at least in part on a first sorted order of the first value of the first data field indicated in the first index entry and the second value of the first data field indicated in the second index entry; and
- determine a first sorted access pointer that identifies the second storage location of first index table in the second memory array to enable the memory sub-system to identify a plurality of data records comprising the second data record in accordance with the first sorted order using the first sorted access pointer when requested by a processing sub-system implemented in the computing system to perform an operation.

17. The computing system of claim 16, wherein, in response to receipt of a memory access request that targets the plurality of data records, the memory-side memory controller is configured to:
when the memory access request identifies the first data field as a target access index:
- identify the first index table as a target index table when the memory access request identifies the first data field as the target access index; and
- determine the first index table by reading the first index table from the second memory array using the first sorted access pointer;

determine storage locations of each data record in the plurality of data in the first memory array by reading a plurality of target index entry positions in the target index table identified by the memory access request; and instruct the one or more memory devices to output the plurality of data records from the storage locations in the first memory array via a system bus coupled between the processing sub-system and the memory sub-system to enable the processing sub-system to perform the operation based at least in part on the plurality of data records.

18. The computing system of claim 16, wherein the memory-side memory controller is configured to:
- determine a data structure used by the second data record, wherein the data structure specifies bit depth of the second data record and one or more bits positions in the second data record used to indicate the first data field;
- instruct the one or more memory devices to allocate the third storage location in the first memory array based at least in part on the data structure used by the second data record in response to receipt of the second data record from a system bus coupled between the processing sub-system and the memory sub-system; and
- instruct the one or more memory devices to store the second data record at the third storage location in the first memory array in response to allocation of the third storage location.

19. The computing system of claim 18, wherein the memory-side memory controller is configured to:
- instruct the one or more memory devices to allocate the third storage location in the first memory array by executing an allocation function based at least in part on the bit depth of second data record specified by the data structure;
- determine the second value of the first data field to be indicated in the second index entry by reading the one or more bit positions specified by the data structure; and
- determine the first sorted access pointer that identifies the second storage location of the first index table in the second memory array by executing a sorted access function in response to generation of the first index table, updating of the first index table to include the second index entry, or both.

20. The computing system of claim 16, wherein:
the first data record comprises a second data field different from the first data field and the second data record comprises the second data field;
the second memory array is configured to store a second index table corresponding with the second data field at a fourth storage location in the second memory array, wherein the second index table comprises a third index entry that indicates the first storage location of the first data record in the first memory array and a third value of the second data field indicated in the first data record; and
the memory-side memory controller is configured to:
- generate a fourth index entry that indicates the third storage location of the second data record in the first memory array and a fourth value of the second data field indicated in the second data record;
- update the second index table to include the fourth index entry based at least in part on a second sorted order of the third value of the second data field indicated in the first index entry and the fourth value of the second data field indicated in the second index entry; and
- determine a second sorted access pointer that identifies the fourth storage location of second index table in the second memory array to enable the memory sub-system to identify the plurality of data records comprising the second data record in accordance with the second sorted order using the second sorted access pointer when requested by the processing sub-system implemented in the computing system to perform the operation.

* * * * *